(12) United States Patent
van Manen

(10) Patent No.: US 11,914,681 B2
(45) Date of Patent: Feb. 27, 2024

(54) DETERMINING AND SELECTING OPERATION FEATURES FOR DIGITAL CONTENT EDITING OPERATIONS WITHIN AN OPERATION SEQUENCE

(71) Applicant: Adobe Inc., San Jose, CA (US)

(72) Inventor: Bob van Manen, Happy Valley, OR (US)

(73) Assignee: Adobe Inc., San Jose, CA (US)

( * ) Notice: Subject to any disclaimer, the term of this patent is extended or adjusted under 35 U.S.C. 154(b) by 325 days.

(21) Appl. No.: 17/138,237

(22) Filed: Dec. 30, 2020

(65) Prior Publication Data

US 2022/0207115 A1    Jun. 30, 2022

(51) Int. Cl.
*G06F 3/0482* (2013.01)
*G06F 21/10* (2013.01)
*H04N 21/81* (2011.01)
*G06T 11/60* (2006.01)

(52) U.S. Cl.
CPC ............ *G06F 21/10* (2013.01); *G06F 3/0482* (2013.01); *G06T 11/60* (2013.01); *H04N 21/812* (2013.01)

(58) Field of Classification Search
CPC .... G06F 21/10; G06F 3/0482; G06F 3/04845; G06T 11/60; H04N 21/812
See application file for complete search history.

(56) References Cited

U.S. PATENT DOCUMENTS

| | | | | |
|---|---|---|---|---|
| 5,640,537 A | * | 6/1997 | Jessen | G06F 11/3664 703/23 |
| 8,254,624 B2 | * | 8/2012 | Seely | G06F 3/1253 382/100 |
| 2011/0262040 A1 | * | 10/2011 | Seely | G11B 27/031 382/167 |
| 2012/0281917 A1 | * | 11/2012 | Seely | G11B 27/034 382/311 |
| 2014/0081976 A1 | * | 3/2014 | Mikawa | G06F 16/51 707/737 |
| 2014/0223337 A1 | * | 8/2014 | Seely | G06F 3/04845 715/753 |
| 2016/0284381 A1 | * | 9/2016 | Yang | G06T 11/60 |
| 2017/0032554 A1 | * | 2/2017 | O'Donovan | G06V 40/16 |
| 2018/0188908 A1 | * | 7/2018 | Freund | G06F 3/0482 |
| 2021/0142540 A1 | * | 5/2021 | Jeyakar | G06T 11/60 |

* cited by examiner

*Primary Examiner* — Hien L Duong
(74) *Attorney, Agent, or Firm* — Keller Preece PLLC

(57) ABSTRACT

The present disclosure relates to systems, methods, and non-transitory computer readable media for accurately, efficiently, and flexibly establishing compatibility connections between successive digital content editing operations in digital content operation pipelines or sequences. In particular, the disclosed systems can determine operation-specific features for executing digital content editing operations within a sequence. For example, the disclosed systems can determine digital image file types (or other digital content operation features) supported by particular digital content editing operations. Additionally, the disclosed systems can select a supported digital content operation feature for performing a particular operation to pass digital content from the operation to the next operation in a supported format, while also preserving quality and information richness.

20 Claims, 12 Drawing Sheets

DETERMINING AND SELECTING OPERATION FEATURES FOR DIGITAL CONTENT EDITING OPERATIONS WITHIN AN OPERATION SEQUENCE

BACKGROUND

Recent years have seen significant developments in software and hardware platforms for generating enhanced digital images through digital image editing pipelines. Indeed, some digital content editing applications utilize cloud service application programming interfaces ("API" s) to perform operations or extract information from digital images or other digital content items. For example, many digital content editing systems can receive API calls to perform one or more editing operations with regard to an input digital image. Utilizing this approach, digital content editing systems can perform operations such as object identification, image cropping, image feature modifications, or image overlays.

Although conventional digital content editing systems can utilize APIs to generate modified digital content items, these systems suffer from a number of technical shortcomings, particularly with regard to the flexibility, accuracy, and efficiency of implementing computing systems. To illustrate, many conventional digital image editing systems are inflexible in performing operations via APIs to generate modified digital content. Specifically, many conventional systems rigidly require administrator devices to develop and provide connecting code/instructions specific to each combination of operations. To illustrate, different operations often have different rigid compatibility features or requirements, such as input and output restrictions. As a result, conventional systems often operate inflexibly by requiring administrator devices to generate and provide rigid instructions for each particular operation in a pipeline so that these operations will work together when executed.

Moreover, many conventional systems are difficult to implement in circumstances that require third-party extensibility. To elaborate, conventional systems are typically incapable of establishing third-party integration with digital content editing operations. Instead, these convention systems rigidly require providing software development kits ("SDK"s) to third-party systems to enable the third-party systems to integrate various digital content editing operations on their own.

In addition, many conventional digital image editing systems generate inaccurate digital content. More specifically, in efforts to bridge the compatibility gap between digital content editing operations, many conventional systems utilize formats or features that degrade quality and richness. For example, conventional systems can utilize an intermediate, low-quality digital image format in performing an operation sequence in an effort to ensure that the format will work across various operations. As a result, these conventional systems lose quality and richness of content in digital images or other digital content items. Indeed, using low-quality formats loses information and reduces the quality of the final digital content output of an operation sequence, especially where some operations are capable of using higher quality, richer-content formats.

In addition to inaccuracy, some conventional digital image editing systems are also inefficient. As mentioned above, many conventional systems require administrator devices to generate and provide operation-specific instructions or code. However, requiring operation-specific instructions for connecting operations requires excessive amounts of computing resources such as processing time, processing power, and memory.

As another example of inefficiency, many conventional digital image editing systems require excessive numbers of user interactions to generate modified digital content. Indeed, conventional systems often provide inefficient user interfaces that require onerous navigation to generate modified digital content by searching for and applying individual digital content editing operations. Processing these excessive user interactions consumes large amounts computing resources, especially in cases of searching for and applying large numbers of operations, which are often repeated for large numbers of digital content items.

Thus, there are several disadvantages with regard to conventional digital image editing systems.

SUMMARY

One or more embodiments described herein provide benefits and solve one or more of the foregoing or other problems in the art with systems, methods, and non-transitory computer readable media that accurately, efficiently, and flexibly establish compatibility connections between successive digital content editing operations in digital content operation pipelines. In particular, in one or more embodiments, the disclosed systems determine requirements or operation-specific features for executing digital content editing operations. Moreover, the disclosed systems can analyze operation definitions within an operation pipeline and select, at each connection point, operation-specific features to make an accurate and efficient connection between operations in the operation sequence. Indeed, in some implementations the disclosed systems select operation-specific features across operations according to a hierarchical list of supported digital content operation features to select those operation-specific features that best preserve information richness throughout the pipeline. Even for digital content editing operations associated with different applications or third-party resources, embodiments of the disclosed systems are capable of establishing compatibility between operation features of digital content editing operations within a pipeline. Thus, the disclosed systems can dynamically select operation-specific features to improve the accuracy and efficiency of digital content editing sequences.

Additional features and advantages of one or more embodiments of the present disclosure are outlined in the description which follows, and in part will be obvious from the description, or may be learned by the practice of such example embodiments.

BRIEF DESCRIPTION OF THE DRAWINGS

This disclosure describes one or more embodiments of the invention with additional specificity and detail by referencing the accompanying figures. The following paragraphs briefly describe those figures, in which.

DETAILED DESCRIPTION

Figure 1:
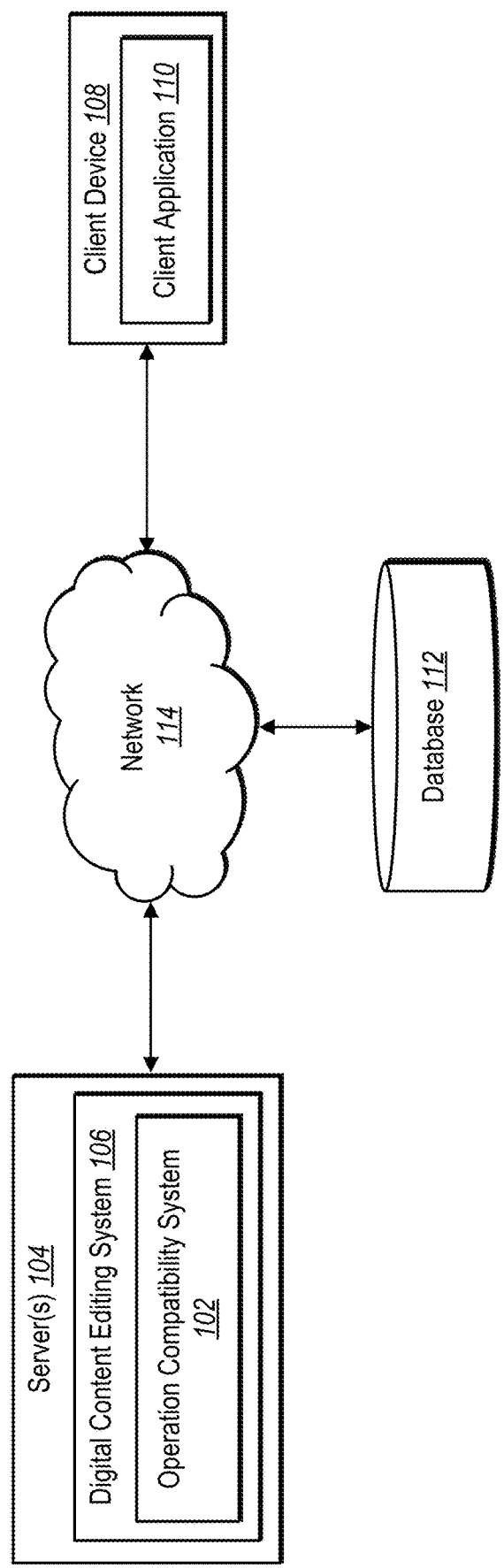
FIG. 1 illustrates an example system environment in which an operation compatibility system operates in accordance with one or more embodiments.

One or more embodiments described herein include an operation compatibility system that accurately, efficiently, and flexibly establishes compatibility connections between successive digital content editing operations in digital content operation pipelines or sequences. For example, the operation compatibility system determines supported digital content operation features for different digital content editing operations to include within a digital content operation sequence of multiple successive operations. In some embodiments, the operation compatibility system compares the supported digital content operation features of a first digital content operation and the supported digital content operation features of a second (e.g., subsequent) digital content operation. Based on the comparison, the operation compatibility system selects a digital content operation feature supported by, or compatible with, both the first operation and the second operation. For instance, the operation compatibility system selects a supported digital content operation feature for the first operation from a hierarchical list of supported digital content operation features of the second operation (e.g., listed in order of information richness). Through this process, in one or more embodiments, the operation compatibility system performs a digital content operation sequence by establishing compatibility between, and executing, sequential digital content editing operations utilizing supported digital content operation features.

As just mentioned, in one or more embodiments the operation compatibility system executes a digital content operation sequence. For example, the operation compatibility system executes multiple successive digital content editing operations as part of a pipeline or a sequence to edit digital content such as digital images, digital videos, digital audio, or other types of digital content. In some embodiments, the operation compatibility system establishes compatibility between, and implements, digital content editing operations from different applications or software programs.

For example, the operation compatibility system utilizes a first digital content editing operation from a first application and a second digital content editing operation from a second application within a single, common operation sequence.

In these or other embodiments, the operation compatibility system establishes compatibility between successive operations while preserving quality and/or information richness associated with digital content passed from operation to operation. For example, the operation compatibility system executes the operations in a sequence utilizing particular supported digital content operation features such as supported formats or file types. Indeed, as suggested above, different digital content editing operations of a single digital content operation sequence have different digital content operation features that they support (or prefer). For example, a first digital image editing operation is capable of generating a digital image in one of a particular set of digital image file types, and a second (e.g., subsequent) digital image editing operation is capable of accepting an input digital image in one of a different set of digital image file types. Thus, to connect the first digital image editing operation to the second digital image editing operation, in some embodiments, the operation compatibility system selects a digital image file type for executing the first digital image editing operation. The operation compatibility system then provides the digital image file type as input for the second digital image editing operation.

As mentioned, in certain described embodiments the operation compatibility system connects digital content editing operations together by selecting commonly supported digital content operation features. To elaborate, in some cases, the operation compatibility system compares a first set of supported digital content operation features (associated with a first digital content editing operation) and a second set of supported digital content operation features (associated with a second digital content editing operation). For example, the operation compatibility system utilizes the second set of supported digital content operation features as a standard by which to measure and select a supported digital content operation to utilize in executing the first digital content editing operation. In some cases, the operation compatibility system selects a feature prioritized or preferred by the second operation and that is also compatible with the first operation. For example, the operation compatibility system identifies a limiting digital content operation feature associated with the second operation, such as an accepted or compatible input digital image file type. Thus, in certain embodiments, the operation compatibility system executes or performs the first digital content editing operation to generate an output digital content item (e.g., output from the first operation) in a format or a file type preferred by the second digital content editing operation (e.g., preferred as input into the second operation), thereby preserving information richness and quality of digital content from operation to operation.

Indeed, in one or more embodiments, the operation compatibility system utilizes a successive or a subsequent set of supported digital content operation features (e.g., a set of digital content operation features supported by a successive or a subsequent operation) as a basis by which to select a supported digital content operation feature for executing a previous or prior operation in a sequence. For example, the operation compatibility system identifies a subsequent set of digital content operation features as a hierarchical listing of digital content operation features, where the operation features are listed in order of preference for the subsequent digital content editing operation. In some cases, a set of digital content operation features is listed based on information richness relative to the respective operation (e.g., where richer file types or other features are listed above those that are less information-rich, or vice-versa).

In certain embodiments, the operation compatibility system automatically (e.g., without user interaction) selects a digital content editing operation to include within a digital content operation sequence. For example, the operation compatibility system determines that a first set of supported digital content operation features associated with a first digital content editing operation includes no digital content operation feature compatible with a second (e.g., subsequent) digital content editing operation. To make this determination, in some cases, the operation compatibility system compares the first set of digital content operation features with a second set of digital content operation features associated with the second operation.

Upon determining that the first operation is incompatible with the second operation (e.g., determining that the first set of digital content operation features includes no common features with the second set of digital content operation features), the operation compatibility system selects a third digital content editing operation to bridge the compatibility gap between the first and second operations. For instance, the operation compatibility system compares a third set of digital content operation features (associated with the third operation) with the first set and the second set to determine that the third set includes digital content operation features compatible with both the first set and the second set. Thus, in certain cases, the operation compatibility system automatically selects a third operation to incorporate within the digital content operation sequence between the first operation and the second operation.

In one or more embodiments, the operation compatibility system extends to third-party digital content editing operations (e.g., digital content editing operations associated with third-party applications). For instance, the operation compatibility system receives user interaction indicating a third-party operation and determines a set of digital content operation features associated with the third-party operation. The operation compatibility system further incorporates the third-party operation into an operation sequence by selecting digital content operation features associated with the third-party operation and causing the third-party system to perform the operation.

In one or more embodiments, the operation compatibility system further provides graphical user interfaces to generate digital content operation sequences and to implement digital content operation sequences. To elaborate, the operation compatibility system provides a digital content operation sequence generation interface for quickly and efficiently arranging and generating a digital content operation sequence. For example, the operation compatibility system provides a digital content operation generation interface for selecting and placing digital content operation elements relative to one another in a sequence.

In addition, in some embodiments, the operation compatibility system provides a digital content operation sequence implementation interface for quickly and efficiently implementing or applying a digital content operation sequence. For example, the operation compatibility system provides a digital content operation implementation interface for applying previously generated sequences to digital content items, sometimes in large numbers at once. Additional detail regarding the digital content operation generation interface and the digital content operation implementation interface is provided below with reference to the figures.

As suggested above, embodiments of the operation compatibility system provide several advantages over conventional digital image editing systems. For example, embodiments of the operation compatibility system provide improved flexibility over conventional digital image editing systems. To illustrate, unlike many conventional systems that rigidly require administrator devices to generate and provide independent computing instructions for connecting each possible combination of operations, the operation compatibility system can automatically analyze defined features corresponding to each operation and flexibly determine individualized operation features to connect operations within a sequence. In addition, embodiments of the operation compatibility system can incorporate third-party digital content editing operations together with native operations in a single digital content operation sequence. Indeed, unlike conventional systems that are incapable of establishing compatibility with third-party operations (and instead merely provide SDKs for third-party systems to access various operations), the operation compatibility system can establish compatibility between digital content operation features of third-party operations and native operations alike within a single operation sequence.

In addition, certain embodiments of the operation compatibility system improve accuracy relative to conventional systems. In particular, while many conventional systems utilize intermediate common formats across entire operation sequences, the operation compatibility system can select operation-specific features to preserve high-quality, information-rich digital content. Indeed, conventional systems often lose large amounts of information by utilizing low-quality intermediate formats or features. The operation compatibility system, on the other hand, individually analyzes each operation of a digital content operation sequence to select high quality digital content operation features for each transition between successive operations.

In addition to improved accuracy, embodiments of the operation compatibility system further provide improved efficiency over many conventional digital image editing systems. As opposed to many conventional systems that require operation-specific code or computer instructions for connecting each pair of operations, the operation compatibility system can individually select digital content operation features for operations included within a digital content operation sequence. By specifically tailoring the selection of operation features between each pair of operations within a sequence, the operation compatibility system requires fewer computing resources such as processing time, processing power, and memory.

As another example of improved efficiency, the operation compatibility system provides more efficient user interfaces than conventional digital image editing systems. For example, the operation compatibility system provides a digital content operation generation interface that, compared to conventional systems, reduces the number of user interactions required to generate sequences of digital content editing operations. In addition, the operation compatibility system provides a digital content operation implementation interface that reduces the number of user interactions required to modify digital images utilizing various digital image editing operations. By requiring and processing fewer user interactions, the operation compatibility system ties up fewer computing resources such as processing time, processing power, and memory that would otherwise be required to process larger numbers of user interactions.

Additional detail regarding the operation compatibility system will now be provided with reference to the figures.

For example, FIG. 1 illustrates a schematic diagram of an example system environment for implementing an operation compatibility system 102 in accordance with one or more embodiments. An overview of the operation compatibility system 102 is described in relation to FIG. 1. Thereafter, a more detailed description of the components and processes of the operation compatibility system 102 is provided in relation to the subsequent figures.

As shown, the environment includes server(s) 104, a client device 108, a database 112, and a network 114. Each of the components of the environment communicate via the network 114, and the network 114 is any suitable network over which computing devices communicate. Example networks are discussed in more detail below in relation to FIG. 12.

As mentioned, the environment includes a client device 108. The client device 108 is one of a variety of computing devices, including a smartphone, a tablet, a smart television, a desktop computer, a laptop computer, a virtual reality device, an augmented reality device, or another computing device as described in relation to FIG. 12. Although FIG. 1 illustrates a single client device 108, in some embodiments the environment includes multiple different client devices, each associated with a different user (e.g., a digital image editor). The client device 108 communicates with the server(s) 104 via the network 114. For example, the client device 108 receives user input from a user interacting with the client device 108 (e.g., via the client application 110) to, for instance, edit or modify digital content such as a digital image, a digital video, or a digital document. In some cases, the client device 108 receives user input via the client application 110 to generate a digital content operation sequence and/or to execute a digital content operation sequence. Thus, the operation compatibility system 102 on the server(s) 104 receives information or instructions to generate a modified digital content item utilizing one or more digital content editing operations stored within the database 112.

As shown, the client device 108 includes a client application 110. In particular, the client application 110 is a web application, a native application installed on the client device 108 (e.g., a mobile application, a desktop application, etc.), or a cloud-based application where all or part of the functionality is performed by the server(s) 104. The client application 110 presents or displays information to a user, including a digital content operation sequence generation interface and/or a digital content operation sequence implementation interface. In some cases, the client device 108 includes the client application 110 as well as a second client application. For example, the client application 110 includes a digital content operation sequence generation interface, and the second client application includes a digital content operation sequence implementation interface. In any case, a user interacts with the client application 110 to provide user input to perform operations as mentioned above, such as selecting an operation element and placing the operation element before or after one or more other operation elements to assemble an operation sequence for editing digital content and/or performing a digital content operation sequence to modify one or more digital content items.

As illustrated in FIG. 1, the environment includes the server(s) 104. The server(s) 104 generates, tracks, stores, processes, receives, and transmits electronic data, such as digital content editing operations and indications of user interactions. For example, the server(s) 104 receives data from the client device 108 in the form of an indication of user interaction selecting a digital content editing operation (e.g., corresponding to an operation element) to include within a digital content operation sequence. In addition, the server(s) 104 transmits data to the client device 108 to provide a modified digital content item such as a modified digital image resulting from executing a digital content operation sequence. Indeed, the server(s) 104 communicates with the client device 108 to transmit and/or receive data via the network 114. In some embodiments, the server(s) 104 comprises a distributed server where the server(s) 104 includes a number of server devices distributed across the network 114 and located in different physical locations. The server(s) 104 comprises a content server, an application server, a communication server, a web-hosting server, a multidimensional server, or a machine learning server.

As shown in FIG. 1, the server(s) 104 also includes the operation compatibility system 102 as part of a digital content editing system 106. The digital content editing system 106 communicates with the client device 108 to perform various functions associated with the client application 110 such as storing and managing a repository of digital content items, modifying digital content items, and providing modified digital content items for display. For example, the operation compatibility system 102 communicates with the database 112 to access a repository of digital content items and a repository of digital content editing operations used to modify one or more stored digital content items. Indeed, as further shown in FIG. 1, the environment includes a database 112. In particular, the database 112 stores information such as a repository of digital images as well as a repository of digital content editing operations.

Although FIG. 1 illustrates a particular arrangement of the environment, in some embodiments, the environment has a different arrangement of components and/or may have a different number or set of components altogether. For instance, in some embodiments, the operation compatibility system 102 is implemented by (e.g., located entirely or in part on) the client device 108 and/or a third-party device. In addition, in one or more embodiments, the client device 108 communicates directly with the operation compatibility system 102, bypassing the network 114. Further, in some embodiments, the database 112 is located external to the server(s) 104 (e.g., in communication via the network 114) or located on the server(s) 104 and/or on the client device 108.

Figure 2:
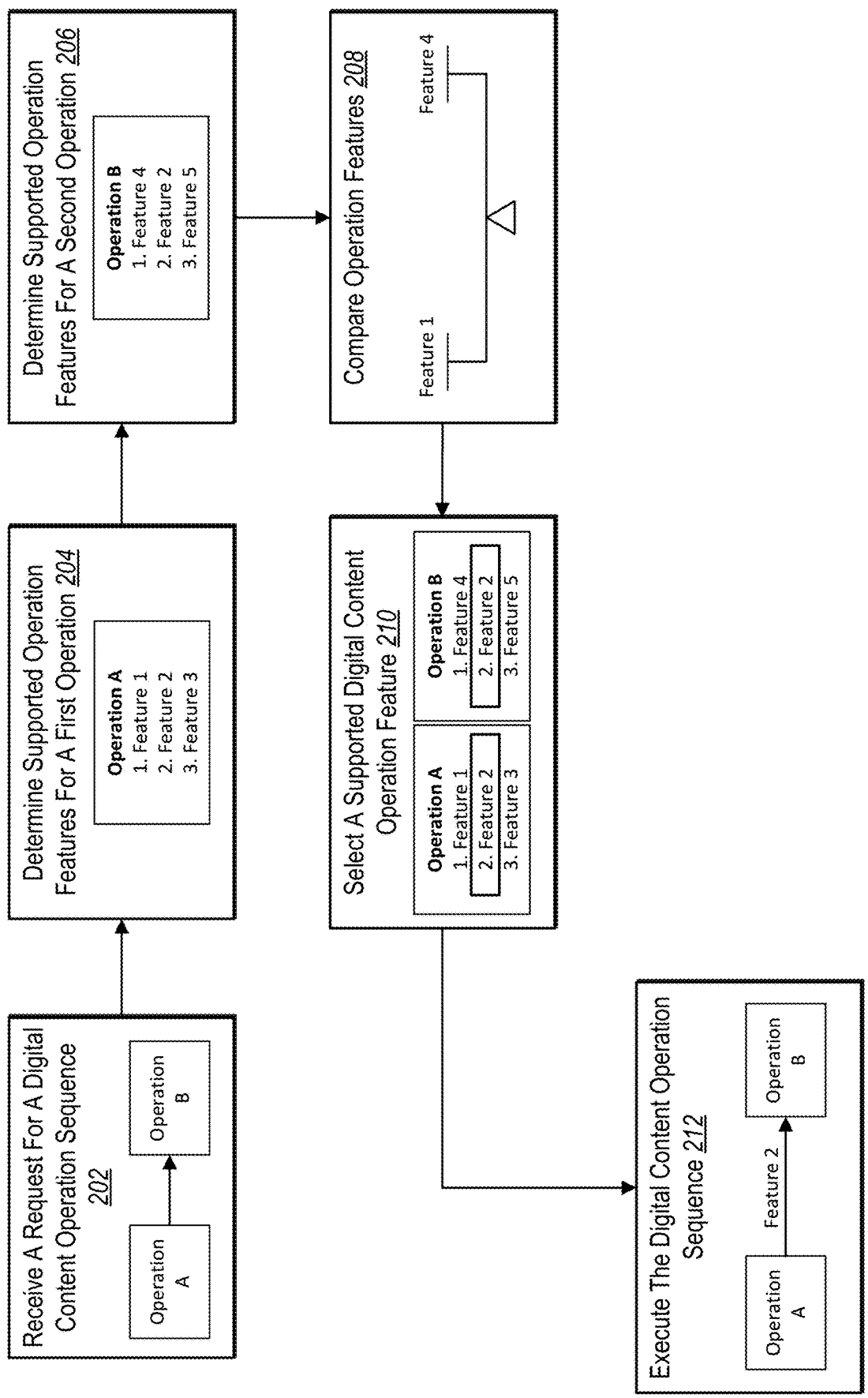
FIG. 2 illustrates an overview of a process of establishing compatibility between operations of, and executing, a digital content operation sequence in accordance with one or more embodiments.

As mentioned, in one or more embodiments, the operation compatibility system 102 executes a digital content operation sequence that includes multiple digital content editing operations. In particular, the operation compatibility system 102 determines and selects digital content operation features to utilize for each operation within the sequence to ensure compatibility from one operation to the next while also preserving quality and information richness of digital content. FIG. 2 illustrates a sequence of acts 202-212 for determining compatibility of features between successive operations of a digital content operation sequence in accordance with one or more embodiments. The description of FIG. 2 provides an overview of the acts 202-212, and additional detail regarding the specific acts is provided thereafter with reference to subsequent figures.

As illustrated in FIG. 2, the operation compatibility system 102 establishes compatibility for, and executes, a digital content operation sequence by performing a series of acts 202-212. In some embodiments, a digital content operation sequence includes one or more digital content editing operations that are performed sequentially, one after another, to generate a modified digital content item. For instance, the operation compatibility system 102 determines how to pass information from one operation to the next to ensure compatibility while also preserving digital content quality and richness. In some embodiments, a digital content operation sequence includes a digital image operation sequence for modifying a digital image.

For example, a digital content editing operation (or sometimes simply "operation") includes a computer operation executable to perform a modification or an edit to a digital content item. In certain cases, a digital content editing operation includes a digital image editing operation to modify color, saturation, objects, foreground, or background of a digital image. For example, a digital content editing operation can include cropping an object from a digital image, adding an object to a digital image, applying a filter to a digital image, replacing a background of a digital image, or modifying color parameters (e.g., hue, saturation, etc.). In some implementations, a digital content operation can also include modifying a color space (e.g., CMYK or RGB), a size (e.g., one or more dimensions), a file type, an orientation, and/or a resolution of a digital image. In other cases, a digital content editing operation includes a digital video editing operation (e.g., to modify a format, a codec, a resolution, a color space, or a length of a digital video) or a digital document editing operation (e.g., to modify a format, a language, or a font of a digital document).

In one or more embodiments, a digital content editing operation includes or defines various supported or compatible digital content operation features (or sometimes simply "features"). In some cases, a digital content operation feature refers to an attribute or a characteristic supported by, or compatible with, a digital content editing operation. For example, a digital content operation feature includes a supported color space, a maximum or minimum size (e.g., one or more maximum or minimum dimensions), a set of supported input file types, a set of supported output file types, a set of supported codecs, supported orientations, and/or supported resolutions. In some embodiments, a digital content operation feature refers to a digital image file type (or a digital video file type or a digital document file type or a digital audio file type).

In some cases, a digital content editing operation defines digital content operation features in a particular order or hierarchy. For instance, some listings of digital content operation features are in order of preference for an operation, where higher-listed features in an operation's definitions are more preferred or more prioritized for the operation. In some embodiments, supported digital content operation features are listed in a hierarchical arrangement according to information richness, where higher-ranked features (e.g., file types, file sizes, color spaces, or image dimensions) are more information rich and/or less lossy. For example, a digital image file type hierarchy of supported digital image file types for a digital image editing operation includes, in order of information richness, PSD, TIFF (includes layers, but not as rich as PSD), PNG (lossless, but has no layers), and JPEG (lossy with no layers). Other digital image file types (or other digital content file types) are also possible.

By implementing a digital content operation sequence, such as the digital content operation sequence illustrated in FIG. 2, the operation compatibility system 102 modifies a digital content item. For example, the operation compatibility system 102 modifies a digital content item such as a digital image, a digital video, a digital document, or a digital audio file. As illustrated in FIG. 2, the operation compatibility system 102 executes a digital content operation sequence including two operations, Operation A and Operation B.

As mentioned, to perform the digital content operation sequence, the operation compatibility system 102 establishes compatibility between Operation A and Operation B. More specifically, the operation compatibility system 102 performs the acts 202-212 to establish compatibility between, and to execute, Operation A followed by Operation B. As shown, the operation compatibility system 102 performs an act 202 to receive a request for a digital content operation sequence. In particular, the operation compatibility system 102 receives user interaction (e.g., via a digital content operation implementation interface displayed on the client device 108) to perform a digital content operation sequence. In some embodiments, the operation compatibility system 102 receives an indication of user interaction requesting the sequence in the form of a drag-and-drop of one or more digital content items into a folder associated with the sequence (and which causes the operation compatibility system 102 to execute the sequence). In other embodiments, the request to perform a digital content operation sequence comes in the form of an upload to a particular folder, an indication of a batch upload and an import folder, an indication of one or more digital images (or other digital content items) and/or folders along with a request to reprocess the digital images and/or folders, and/or an indication to change a sequence of operations within a pipeline (e.g., within a user interface).

As shown in FIG. 2, the operation compatibility system 102 also performs an act 204 to determine supported operation features for a first operation. More specifically, in response to the user interaction requesting the digital content operation sequence, the operation compatibility system 102 determines supported digital content operation features associated with Operation A (e.g., the first operation in the sequence). For example, the operation compatibility system 102 processes definitions associated with Operation A to identify features such as a unique operation identifier, a number of names input slots, an output slot, and an indication of whether the operation can be used for automatic conversions.

Additionally, the operation compatibility system 102 identifies other supported features such as an ordered list of supported file types (e.g., digital image file types, digital video file types, digital document file types, or digital audio file types). In some cases, the operation defines the list of supported features (e.g., file types) in a hierarchy, ordered according to preference of the operation (e.g., where higher-ranked features are more preferred by the operation or vice-versa). For instance, in some cases a listing of digital image file types is ordered in a hierarchical arrangement of information richness, where higher-ranked file types are richer (e.g., include more information) and are therefore more preferred. In some embodiments, the listing of digital content operation features (or digital image file types) is in order of information loss, where higher-ranked features (or file types) are less lossy and lower-ranked features (or file types) are more lossy. As shown, the operation compatibility system 102 identifies the supported features of Operation A such as Feature 1, Feature 2, and Feature 3, ordered in relation to Operation A (e.g., where Feature 1 is highest priority or most preferred).

In addition, the operation compatibility system 102 performs an act 206 to determine supported operation features for a second operation. Indeed, as shown in FIG. 2, the operation compatibility system 102 determines supported digital content operation features for Operation B, which immediately follows Operation A in the sequence. In particular, the operation compatibility system 102 accesses definitions of Operation B to identify supported digital content operation features (e.g., listed in a hierarchical arrangement in relation to Operation B). As illustrated in FIG. 2, the operation compatibility system 102 identifies Feature 4, Feature 2, and Feature 5 as supported features for Operation B, listed according to information richness and/or preference of Operation B (e.g., where Feature 4 is highest priority or most preferred).

As further illustrated in FIG. 2, the operation compatibility system 102 performs an act 208 to compare operation features. More specifically, the operation compatibility system 102 compares supported digital content operation features of Operation A with those of Operation B. Indeed, the operation compatibility system 102 compares features to identify features supported by both operations, so that Operation A generates an output that is acceptable to Operation B (while also preserving information richness). As shown, the operation compatibility system 102 compares Feature 1 (from Operation A) with Feature 4 (from Operation B). Likewise, the operation compatibility system 102 compares other features of Operation A with other features of Operation B. Based on the comparison, the operation compatibility system 102 identifies one or more digital content operation features supported by both Operation A and Operation B.

Additionally, the operation compatibility system 102 performs an act 210 to select a supported digital content operation feature. Indeed, the operation compatibility system 102 selects a digital content operation feature that is compatible with both Operation A and Operation B and that preserves information richness of a digital content item passed from Operation A to Operation B. For example, the operation compatibility system 102 identifies a limiting digital content operation feature associated with Operation B and selects a corresponding digital content operation feature of Operation A for the limiting feature. In some cases, Operation B accepts only one type (or one of a set of types) of digital content as input as a limiting feature, and the operation compatibility system 102 thus selects a feature for Operation A to generate digital content compatible with the acceptable input of Operation B.

In some cases, the operation compatibility system 102 selects a highest-ranked digital content operation feature of Operation B that is also supported by Operation A for utilizing in Operation A. Indeed, because Operation B receives the output generated by Operation A as input, the digital content operation features supported by Operation B dictate which feature to select for executing Operation A. To elaborate, the quality or information richness of a digital content item generated or output by the digital content operation sequence is limited by the output of Operation B (e.g., because the sequence does not end with Operation A). Thus, the operation compatibility system 102 selects a supported digital content operation feature for utilizing in Operation A that provides a highest possible information richness supported by Operation B, thereby enabling Operation B to also generate a highest quality output possible. As shown, the operation compatibility system 102 selects Feature 2 because Feature 2 is the highest-quality (or only) digital content operation supported by both Operation A and Operation B.

As further illustrated in FIG. 2, the operation compatibility system 102 performs an act 212 to execute the digital content operation sequence. More specifically, the operation compatibility system 102 executes the digital content operation sequence by performing Operation A followed by Operation B. As shown, the operation compatibility system 102 performs Operation A utilizing Feature 2 to generate a modified digital content item which is then passed to Operation B for further modification.

Figure 3:
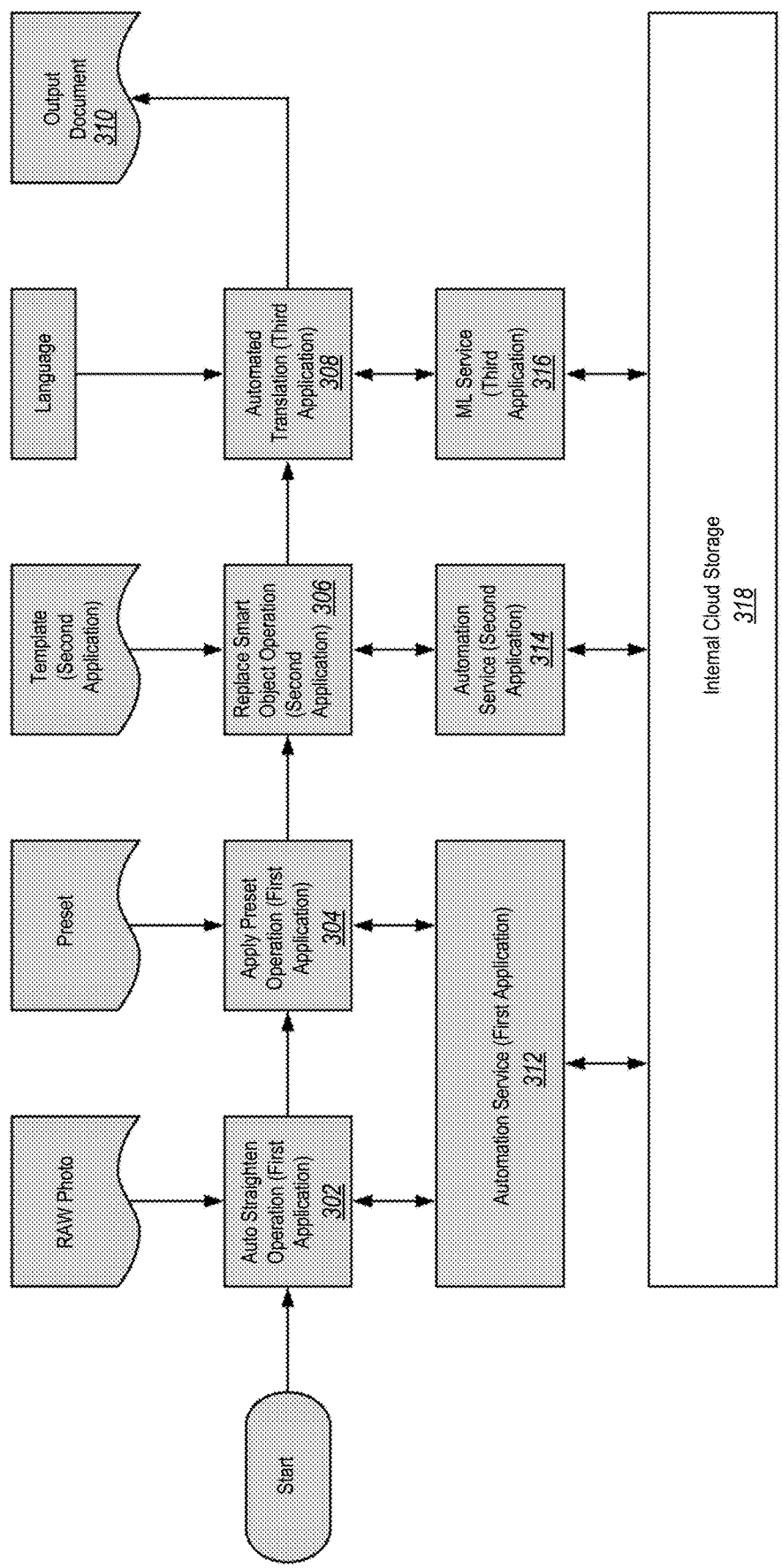
FIG. 3 illustrates an example digital image operation sequence in accordance with one or more embodiments.

As mentioned above, in some embodiments, the operation compatibility system 102 performs a digital content operation sequence in the form of a digital image operation sequence including multiple digital image editing operations. In particular, the operation compatibility system 102 generates a modified digital image utilizing multiple digital image editing operations in a sequence. FIG. 3 illustrates a digital image operation sequence including a plurality of digital image editing operations in accordance with one or more embodiments.

As illustrated in FIG. 3, the operation compatibility system 102 performs a digital image operation sequence including the digital image editing operations 302-308. In some cases, different digital image editing operations (or operations for editing other digital content) are associated with different applications or software programs. For example, the operation compatibility system 102 performs the auto straighten operation 302 from a first digital image editing application (e.g., ADOBE LIGHTROOM®).

To perform the auto straighten operation 302, the operation compatibility system 102 communicates with an automation service 312 associated with the first digital image editing application to access a digital image (or some other digital content item) from an internal cloud storage 318 (e.g., the database 112). In addition, the operation compatibility system 102 communicates with the automation service 312 to perform the auto straighten operation 302 (on the accessed digital image) by reading the operation from the internal cloud storage 318 and storing the result back on the internal cloud storage 318. As shown, the auto straighten operation 302 accepts a raw photo as input (e.g., a digital image captured or uploaded by the client device 108 to the internal cloud storage 318 or a third-party cloud storage) and performs the auto straighten operation to the raw photo.

In addition, the operation compatibility system 102 performs an apply preset operation 304, which is also associated with the first digital image editing application. More specifically, the operation compatibility system 102 communicates with the automation service 312 to access (from the internal cloud storage 318) and incorporate the apply preset operation 304 after the auto straighten operation 302. To incorporate the apply preset operation 304 as part of the digital image operation sequence, the operation compatibility system 102 selects a digital image file type for utilizing in the auto straighten operation 302. Indeed, the operation compatibility system 102 compares output digital image file types supported by the auto straighten operation 302 and input digital image file types supported by the apply preset operation 304 to identify and select a digital image file type. As suggested above, the operation compatibility system 102 selects a digital image file type that is the most information-rich file type available that is also supported by both the auto straighten operation 302 and the apply preset operation 304.

As shown, the operation compatibility system 102 executes the apply preset operation 304 to modify the output digital image generated by the auto straighten operation 302. Indeed, the operation compatibility system 102 utilizes the auto straighten operation 302 to modify the raw photo by applying one or more presets. In some embodiments, the operation compatibility system 102 also modifies the raw photo into a different format or file type compatible with the apply preset operation 304. In some cases, however, the auto straighten operation 302 generates an output in a format (e.g., DNG) compatible with the apply preset operation 304, and the operation compatibility system 102 thus retains the full color fidelity a digital image from the auto straighten operation 302 to the apply preset operation 304 without changing the format. Thus, the operation compatibility system 102 utilizes the apply preset operation 304 to modify the digital image via preset modifications (e.g., a predetermined color modification, a predetermined size modification, or some other type of predetermined modification) defined by the operation compatibility system 102 or by the client device 108.

As further illustrated in FIG. 3, the operation compatibility system 102 performs a replace smart object operation 306 associated a second digital image editing application (e.g., ADOBE PHOTOSHOP®). To elaborate, the operation compatibility system 102 communicates with an automation service 314 associated with a second digital image editing application to read the replace smart object operation 306 from the internal cloud storage 318 and to store the result back on the internal cloud storage 318. Indeed, the operation compatibility system 102 is capable of incorporating digital image editing operations from different digital image editing applications into a single digital image operation sequence.

To incorporate the replace smart object operation 306, the operation compatibility system 102 determines an output digital image file type for utilizing with the apply preset operation 304. More specifically, the operation compatibility system 102 determines one of a set of file types acceptable as input for the replace smart object operation 306. The operation compatibility system 102 further selects a digital image file type for executing the apply preset operation 304 by, for example, selecting a highest-ranked file type from the listing of supported file types associated with the replace smart object operation 306. In some cases, the replace smart object operation 306 accepts only one limiting file type of digital image as input, and the operation compatibility system 102 thus identifies and selects the limiting digital image file type associated with the replace smart object operation 306.

As illustrated in FIG. 3, the operation compatibility system 102 executes the replace smart object operation 306 by applying a template (e.g., a template generated via the first digital image editing application or the second digital image editing application and/or as part of a different operation pipeline) to replace a smart object of the digital image output by the apply preset operation 304. To perform the replace smart object operation 306, the operation compatibility system 102 determines and selects a supported digital image file type associated with the automated translation operation 308.

Similar to the above discussion, the operation compatibility system 102 compares supported (input) digital image file types of the automated translation operation 308 with supported (output) digital image file types of the replace smart object operation 306. Based on the comparison, the operation compatibility system 102 selects a supported digital image file type supported by both the automated translation operation 308 and the replace smart object operation 306. In some cases, the operation compatibility system 102 selects a digital image file type (e.g., a highest-ranked, least lossy, and/or most information-rich digital image file type) from a hierarchical listing of supported digital image file types associated with the automated translation operation 308.

Indeed, the operation compatibility system 102 performs the automated translation operation 308 by communicating with a machine learning ("ML") service 316 associated with a third application (e.g., a machine learning application). For example, the operation compatibility system 102 communicates with the ML service 316 to access the automated translation operation 308 from the internal cloud storage 318. As illustrated in FIG. 3, the operation compatibility system 102 utilizes the automated translation operation 308 to apply a language translation to (text of) the digital image output by the replace smart object operation 306. Thus, the operation compatibility system 102 generates the output document 310 from the digital image operation sequence including the digital image editing operations 302-308.

In some cases, the operation compatibility system 102 receives certain limitations or preferences for the output document 310 from the client device 108. For example, the operation compatibility system 102 receives an indication of an output resolution or size (e.g., 500×800 pixels). Thus, in cases where the automated translation operation 308 supports scaling or resizing a digital image, the operation compatibility system 102 generates the output document 310 in the requested dimensions via the scaling functionality of the automated translation operation 308. In cases where the automated translation operation 308 does not support scaling, however, the operation compatibility system 102 identifies, selects, and automatically inserts an operation that is capable of scaling the digital image into the requested resolution to generate the output document 310.

In some embodiments, the operation compatibility system 102 walks back and identifies another operation (e.g., the replace smart object operation) earlier in the pipeline that is capable of performing the requested scaling to resize the digital image earlier in the pipeline. As another example, the operation compatibility system 102 receives an indication of a particular format for the output document 310. Thus, the operation compatibility system 102 identifies an operation within the pipeline capable of converting the digital image into the requested format and carries the requested format through subsequent operations as well, as long as the operations are compatible with the requested format and even if other formats are higher ranked. Indeed, in some cases, the operation compatibility system 102 identifies an earliest possible operation for generating a digital image in an output format, where each subsequent operation in the pipeline is also compatible with the output format.

Although FIG. 3 illustrates digital image editing operations 302-308 in a particular order, alternative orders are possible. Indeed, the operation compatibility system 102 can incorporate and arrange operations in any order utilizing the techniques described herein to establish compatibility from operation to operation.

Figure 4:
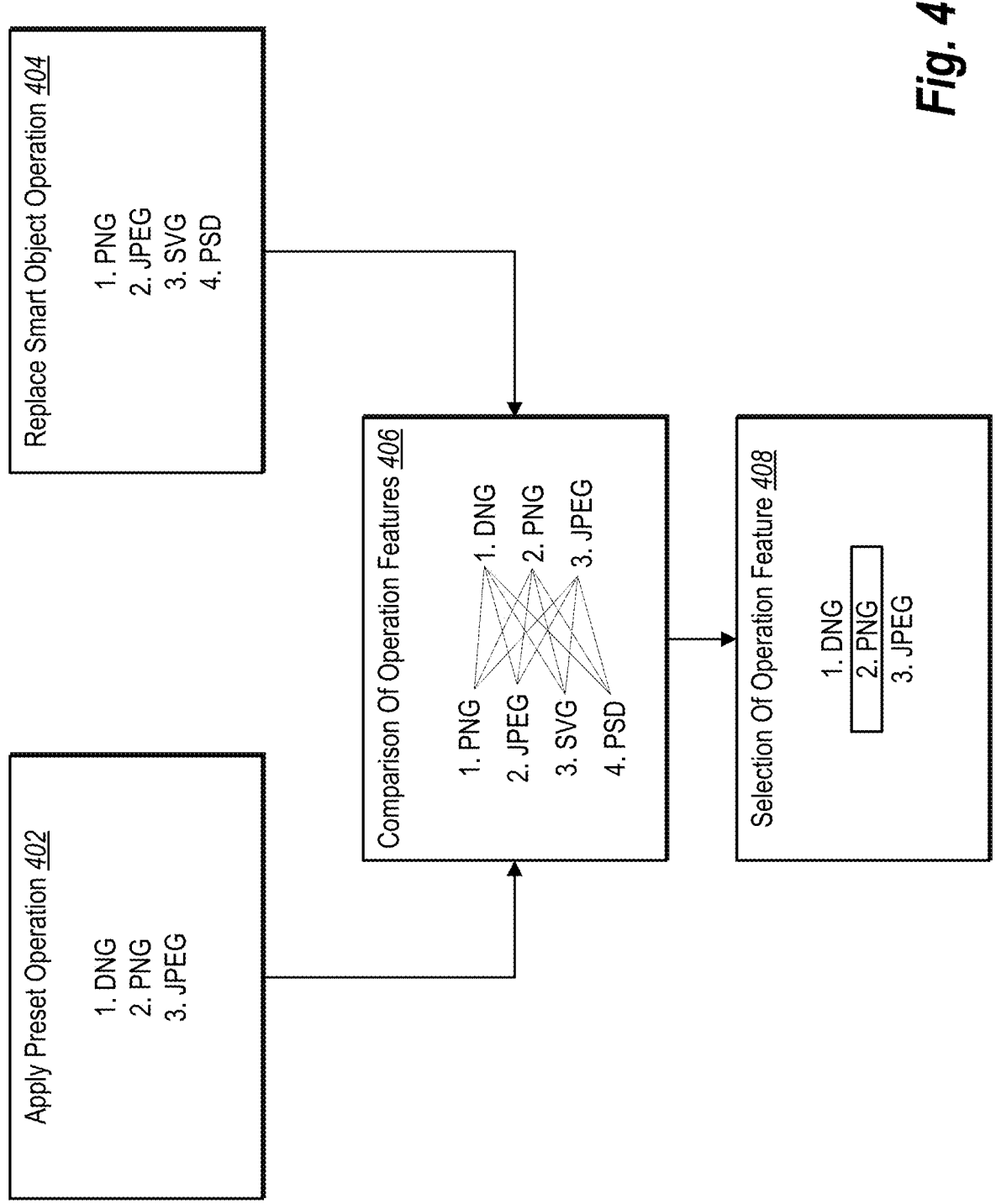
FIG. 4 illustrates an example comparison of digital content operation features in accordance with one or more embodiments.

As mentioned above, in certain described embodiments, the operation compatibility system 102 compares supported digital content operation features (e.g., supported digital image file types) of adjacent or sequential operations in a sequence. In particular, the operation compatibility system 102 compares supported features of a prior operation and a subsequent operation to select digital content operation features for utilizing with respect to the prior operation. FIG. 4 illustrates an example comparison of supported digital content operation features of two adjacent operations in accordance with one or more embodiments.

As illustrated in FIG. 4, the operation compatibility system 102 identifies supported digital content operation features (e.g., supported digital image file types) for an apply preset operation 402. Specifically, the operation compatibility system 102 accesses or determines definitions of the apply preset operation that indicate a hierarchical listing of supported digital content operation features. As shown, the apply preset operation 402 lists supported digital image file types in order of preference and/or information richness, where DNG is ranked first, PNG is ranked second, and JPEG is ranked third. Indeed, DNG images are the most information rich of the three formats, while JPEG is the least information rich.

As also illustrated in FIG. 4, the operation compatibility system 102 identifies supported digital content operation features (e.g., supported digital image file types) for a replace smart object operation 404, which immediately follows the apply preset operation 402 in an operation sequence. Specifically, the operation compatibility system 102 determines or identifies a hierarchical listing of supported digital image file types. As shown, the operation compatibility system 102 identifies PNG as highest-ranked, JPEG next, then SVG, and PSD.

As further illustrated in FIG. 4, the operation compatibility system 102 performs a comparison of operation features 406. More particularly, the operation compatibility system 102 compares the supported digital content operation features of the apply preset operation 402 with the supported digital content operation features of the replace smart object operation 404. To compare the features, the operation compatibility system 102 utilizes the supported features of the replace smart object operation 404 (e.g., the subsequent operation) as the limiting factor, or the standard by which to determine, which feature to select. In some cases, however, the operation compatibility system 102 utilizes a master list of digital content operation feature hierarchy (e.g., digital image file type hierarchy) maintained at the system level. For example, the operation compatibility system 102 maintains a digital content operation feature hierarchy that indicates which features are preferred (e.g., are more information rich or less lossy) over other features.

For example, as shown, the operation compatibility system 102 compares each listed feature (or file type) associated with the replace smart object operation 404 with each listed feature (or file type) associated with the apply preset operation 402 in turn. Particularly, the operation compatibility system 102 compares the PNG file type of the replace smart object operation 404 with the DNG file type, the PNG file type, and the JPEG file type of the apply preset operation 302. Then, the operation compatibility system 102 compares the JPEG file type of the replace smart object operation 404 with each of the DNG, PNG, and JPEG file types of the apply preset operation 402. Likewise, the operation compatibility system 102 compares the SVG and PSD file types with the DNG, PNG, and JPEG file types as well.

As a result of the comparison, the operation compatibility system 102 performs a selection of an operation feature 408. In particular, the operation compatibility system 102 identifies one or more commonly supported digital content operation features (or commonly supported digital image file types). For example, the operation compatibility system 102 identifies PNG and JPEG as file types supported by both the apply preset operation 402 and the replace smart object operation 404. In addition, the operation compatibility system 102 determines that PNG is higher ranked than JPEG in the hierarchy of preferred (or more information rich) digital image file types for the replace smart object operation 404 (e.g., the subsequent operation). Thus, the operation compatibility system 102 selects PNG as the digital content operation feature (or the digital image file type) to utilize in performing the apply preset operation 402 (e.g., the prior operation of the two).

Figure 5:
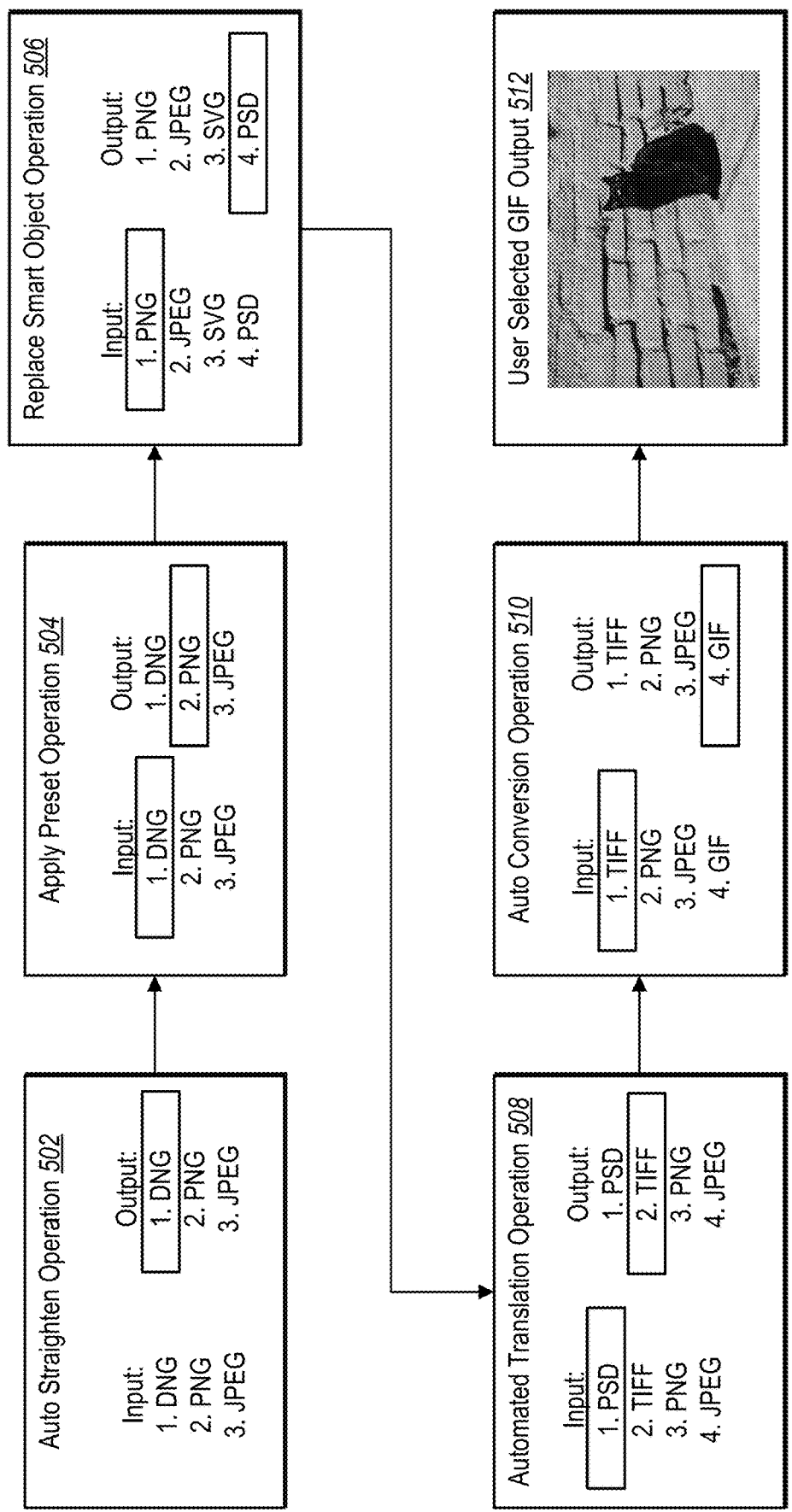
FIG. 5 illustrates an example digital image operation sequence in accordance with one or more embodiments.

As mentioned, in one or more embodiments, the operation compatibility system 102 performs a digital image operation sequence. In particular, to execute the digital image operation sequence, the operation compatibility system 102 compares supported digital image file types for each successive operation and selects file types for each transition between adjacent operations. FIG. 5 illustrates a digital image operation sequence including digital image editing operations 502-512 in accordance with one or more embodiments.

As illustrated in FIG. 5, the operation compatibility system 102 selects a supported digital image file type for each digital image editing operation. Particularly, the operation compatibility system 102 analyzes supported digital content operation features for inputs and outputs of various operations. In some cases, the operation compatibility system 102 compares the supported output digital image file types with the supported input digital image file types of the next operation in the sequence to select a file type for performing an operation. For example, as shown, the operation compatibility system 102 selects the DNG file type for the auto straighten operation 502 by comparing the supported output file types of the auto straighten operation 502 with the supported input file types of the next operation (e.g., the apply present operation 504).

As described, the operation compatibility system 102 selects the DNG file type by looking to the hierarchical listing of supported digital image file types for the apply preset operation 504 (e.g., the next operation in the sequence). For instance, the operation compatibility system 102 analyzes a listing of supported input file types for the apply preset operation 504. Indeed, the operation compatibility system 102 identifies the DNG file type as the highest ranked (e.g., most preferred and/or most information rich) file type for the input of the apply preset operation 504. The operation compatibility system 102 therefore selects the DNG file type for the output of the auto straighten operation 502 (which is included within the listing of file types supported by the auto straighten operation 502) to thereby generate a DNG output to pass to the apply preset operation 504.

In like fashion, the operation compatibility system 102 selects supported digital image file formats for other operations as well. For example, the operation compatibility system 102 compares the listing of supported input digital image file types for the replace smart object operation 506 with those of the output of the apply preset operation 504. From the comparison, the operation compatibility system 102 selects the PNG file type for the apply preset operation (PNG is top ranked for the replace smart object operation 506).

Similarly, based on the listing of supported input file types for the automated translation operation 508, the operation compatibility system 102 selects the PSD file type for the replace smart object operation 506. Further, based on the listing of supported input digital image file types for the auto conversion operation 510, the operation compatibility system 102 selects the TIFF file type for the automated translation operation 508. Thus, the operation compatibility system 102 selects digital image file types for each transition between operations to pass digital images in the various file types from operation to operation.

In some cases, supported input features (e.g., file types) are not necessarily the same as supported output features (e.g., file types) for a given operation. For example, a given operation may list a first set of supported digital content operation features for input and a second set of supported digital content operation features for output. In some cases, for instance, an operation supports only a single digital image file type (or digital video file type or digital document file type) as input, while supporting four or five file types for output. The operation compatibility system 102 thus selects supported features based on comparing supported output features of a prior operation with supported input features of a subsequent operation.

In addition to selecting digital image file types (or other digital content operation features) based on comparing file types (or other features) across operations, the operation compatibility system 102 selects a digital image file type based on user interaction. For example, the operation compatibility system 102 receives user interaction via a user interface on the client device 108 to select a particular digital image file type (or some other digital content operation feature). As shown in FIG. 5, the operation compatibility system 102 receives an indication of a user selected GIF output 512. Based on the indication of user selection of a GIF file type for the output of the digital image operation sequence (or for the auto conversion operation 510), the operation compatibility system 102 selects the GIF file type for the auto conversion operation 510 (e.g., the last operation in the sequence).

Although FIG. 5 illustrates selecting supported digital image file types (or other supported digital content operation features) based on adjacent or subsequent operations in a sequence, alternative methods are possible. For instance, in some embodiments, the operation compatibility system 102 looks beyond the next adjacent operation to compare features to select for performing a prior operation. In some cases, the operation compatibility system 102 compares features (e.g., file types) of three or four (or more) digital content editing operations together to identify commonly supported features and to select a (highest-ranked and/or most information rich) digital content operation feature from the last operation of those compared to use for the previous operations. In other cases, the operation compatibility system 102 compares features for all digital content operations of a sequence to select a feature from the last operation to use for previous operations.

While FIG. 5 illustrates a particular type of digital content operation features (e.g., digital image file types), the operation compatibility system 102 performs similar functionality to establish compatibility between operations for other digital content operation features as well. For example, the operation compatibility system 102 analyzes each operation within the digital content operation sequence to identify features such as a maximum width and a maximum height of a digital image. For machine learning workers, for instance, only a small digital image is required to perform classification or tagging of the digital image. Based on this constraint, the operation compatibility system 102 resizes a digital image earlier in a digital content operation sequence (e.g., at the beginning of the sequence or at a previous operation) to prevent wasted time and resources in expensive image operations on larger digital images.

As another example, the operation compatibility system 102 utilizes color space as a digital content operation feature. For instance, the operation compatibility system 102 determines that a print operation utilizes the CMYK color space. Because converting from CMYK to RGB and back loses a lot of information and/or digital image quality, the operation compatibility system 102 selects the CMYK color space earlier in the operation sequence (e.g., at the beginning of the sequence or at a previous operation) to prevent such loss of quality or information.

As an additional example, the operation compatibility system 102 retains metadata information between operations of a pipeline as well. For example, some operations support XMP metadata, while other operations support different formats such as EXIF or IPTC. Similar to the above discussion, the operation compatibility system 102 thus identifies compatible metadata formats from one operation to the next within the pipeline to retain information such as the author, the rights, the origin, keywords, and other metadata information. In certain cases, the operation compatibility system 102 upgrades inferior metadata formats such as EXIF or IPTC to richer formats such as XMP using one or more operations.

Not only does the operation compatibility system 102 establish compatibility between operations of a digital content operation sequence for modifying digital images, but the operation compatibility system 102 also does so for sequences for modifying other types of digital content as well. For example, the operation compatibility system 102 modifies digital videos in wide variety of formats and codecs. Not every digital video editing operation supports all video formats, and by selecting supported formats for sequential operations, the operation compatibility system 102 is able to perform video compositing, effects generation, automated subtitles (and automated subtitle translation), and video transcoding on the fly (e.g., without preprocessing requirements of conventional systems).

Additionally, video formats often put constraints on video sizes (e.g., some formats require the width and height to be a multiple of two). By utilizing these specific format constraints, along with the comparison of supported digital content operation features between operations, the operation compatibility system 102 reduces information losses while processing smaller amounts of video content (thereby saving computing resources). For instance, the operation compatibility system 102 pushes dimension requirements of a particular output format for a given operation through to one or more previous operations to reduce the amount of video information to process for operations that would otherwise utilizes higher-resolution, larger digital videos.

Further, the operation compatibility system 102 establishes compatibility between operations for editing digital documents as well. In particular, the operation compatibility system 102 determines particular digital content operation features such as document formats (e.g., InDesign, Word, OpenOffice, or TXT) supported by given operations. For example, certain digital document editing operations utilize reduced versions of a document format. By determining supported formats between successive operations, the operation compatibility system 102 performs text transformations (e.g., translation or classification) on a general format and then apply the transformation back to the original format without needing to write every operation for supporting each possible format.

In certain embodiments, the operation compatibility system 102 merges operations into a single call to further improve performance and computational efficiency. To elaborate, the operation compatibility system 102 identifies sequential digital image editing operations associated with a common digital image editing application and merges them into a single call from the application. In some cases, the operation compatibility system 102 arranges digital image editing operations in the pipeline so that operations common to a single application are sequential to thereby merge them into a single call and avoid expending time and resources on multiple operation calls. For instance, the operation compatibility system 102 determines that the auto straighten operation 502 and the apply preset operation 504 are both ADOBE LIGHTROOM operations, and the operation compatibility system 102 thus places them in the pipeline one after the other for merging the request for both operations into a single call. In one or more embodiments, the operation compatibility system 102 merges the request for both operations into a single call without necessarily arranging the operations sequentially in the pipeline.

In some embodiments, the operation compatibility system 102 performs a step for generating a modified digital content item in accordance with the first set of supported digital content operation features and the second set of supported digital content operation features. The above description of FIGS. 2-5, provides supporting acts and algorithms (e.g., structure) for performing a step for generating a modified digital content item in accordance with the first set of supported digital content operation features and the second set of supported digital content operation features. For example, in some embodiments, the step for generating a modified digital content item in accordance with the first set of supported digital content operation features and the second set of supported digital content operation features includes determining supported digital content operation features for a first operation and a second operation, comparing the supported digital content operation features for the two operations (as described above), selecting a digital content operation feature based on the comparison (as also described above), and performing the operations to modify a digital content item.

Figure 6:
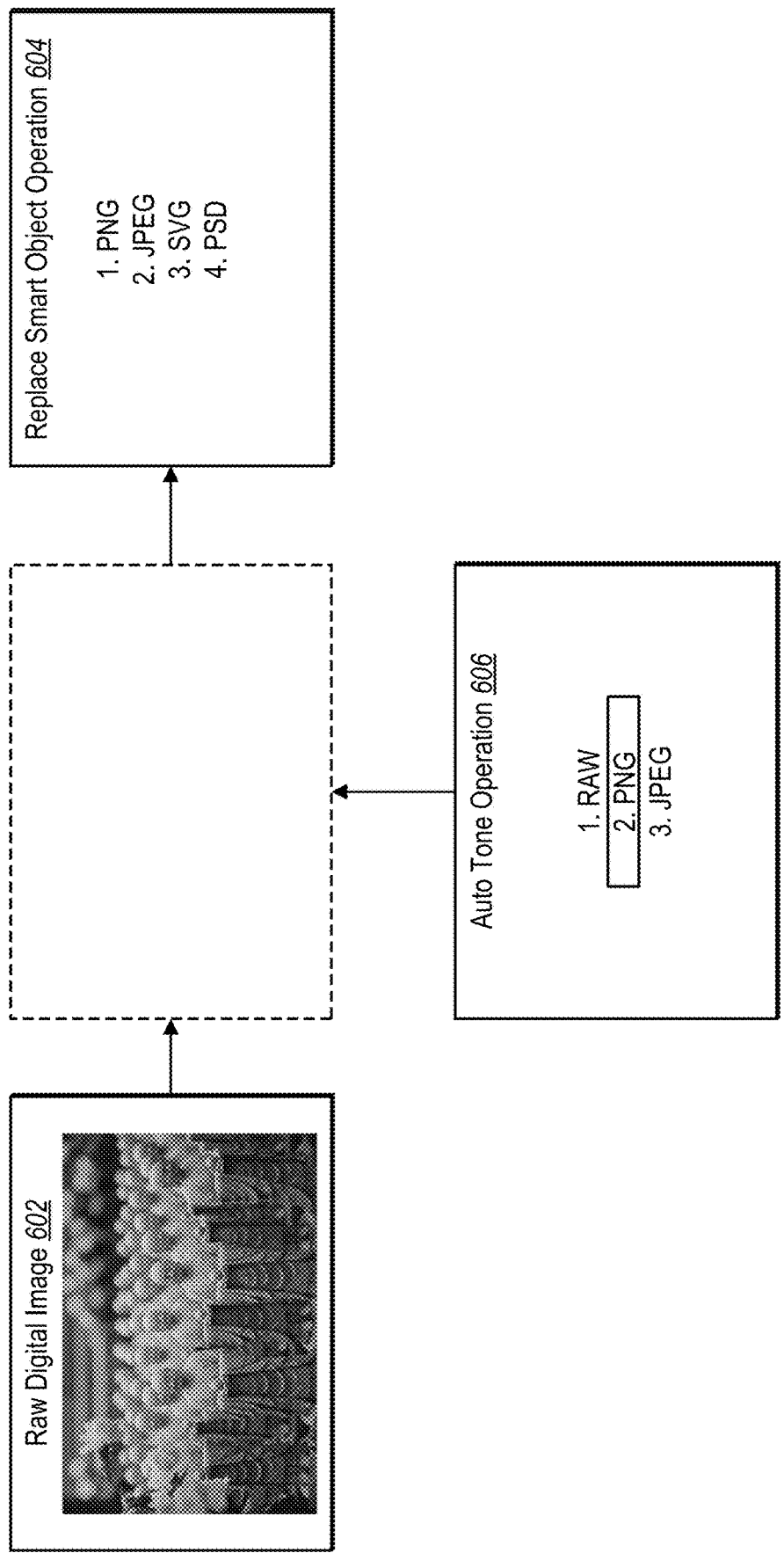
FIG. 6 illustrates utilizing a digital content editing operation to bridge a compatibility gap between other operations in accordance with one or more embodiments.

As mentioned, in certain embodiments, the operation compatibility system 102 automatically (e.g., without user input) determines and incorporates a digital content editing operation into a digital content operation sequence. In particular, the operation compatibility system 102 determines that a first digital content editing operation is incompatible with a second (e.g., subsequent or successive) digital content editing operation and automatically identifies a third digital content editing operation to bridge the gap between the first operation and the second operation. FIG. 6 illustrates automatically identifying and incorporating a digital content editing operation into a digital content operation sequence in accordance with one or more embodiments.

As illustrated in FIG. 6, the operation compatibility system 102 receives a raw digital image 602 from the client device 108 (e.g., as an upload or a captured digital image). In one or more embodiments, the operation compatibility system 102 further receives an indication of a user selection to execute a digital content operation sequence. For instance, the operation compatibility system 102 receives a request to execute a sequence where the first operation is the replace smart object operation 604. However, the operation compatibility system 102 also determines that the replace smart object operation 604 is incompatible with the received raw digital image 602. Particularly, the operation compatibility system 102 determines that the listing of supported digital content operation features of the replace smart object operation 604 does not include raw digital images.

Based on determining that the replace smart object operation 604 is incompatible with the raw digital image 602 and that, therefore, the operation compatibility system 102 cannot perform the replace smart object operation 604 (or other operation sequence), the operation compatibility system 102 further identifies an operation to incorporate within the operation sequence. In particular, the operation compatibility system 102 accesses a repository of digital content editing operations to identify and selecting an operation to include within the sequence. For example, the operation compatibility system 102 selects an operation that is compatible with the raw digital image 602 as well as the replace smart object operation 604.

As shown, the operation compatibility system 102 selects the auto tone operation 606 to incorporate within the digital content operation sequence after receiving the raw digital image 602 and before the replace smart object operation 604. Indeed, the auto tone operation 606 is compatible with the raw digital image 602 and the replace smart object operation 604. In particular, the auto tone operation 606 includes raw digital images as a supported (input) digital image file type and also includes PNG and JPEG as supported (export) digital image file types (which are both listed in the supported digital image file types of the replace smart object operation 604). Indeed, to select the auto tone operation 606, the operation compatibility system 102 compares the supported digital image file types of the auto tone operation 606 with the file type of the raw digital image 602 and the supported digital image file types of the replace smart object operation 604. In some cases, the operation compatibility system 102 selects a different digital content editing operation, such as an auto conversion operation (e.g., to convert from one digital content type to another), to automatically include within a sequence.

In some embodiments, the operation compatibility system 102 also (or alternatively) selects and incorporates a digital content editing operation between two other operations. For example, the operation compatibility system 102 identifies a first digital image editing operation and a second, successive digital image editing operation that do not share any supported digital image file types in common. Thus, the operation compatibility system 102 identifies and incorporates an intermediate digital content editing operation that includes digital content operation features common to both the first operation and the second operation.

In one or more embodiments, the operation compatibility system 102 incorporates the best of two or more possible digital content editing operations. For example, the operation compatibility system 102 identifies multiple digital content editing operations that would effectively bridge the compatibility gap between a first operation in a sequence and a second operation. In addition, the operation compatibility system 102 compares the digital content operation features of each possible new operation to include to identify the operation with digital content operation features more preferred by the second operation (e.g., the operation in the sequence that would occur after the newly incorporated operation). For example, the operation compatibility system 102 selects an intermediate digital content editing operation that, compared to another possible intermediate operation, includes a more information rich feature shared by both the first operation and the second operation.

Figure 7:
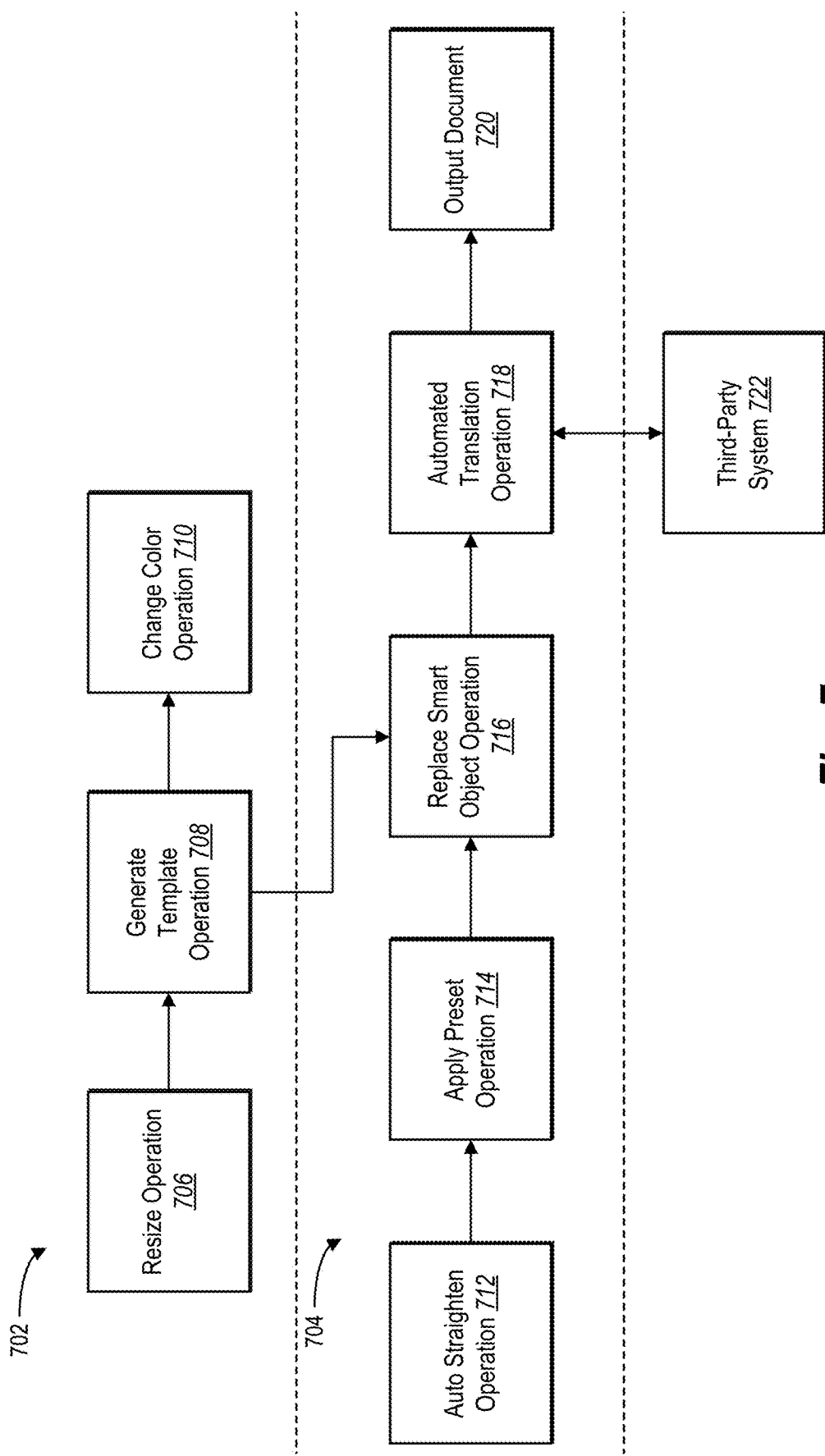
FIG. 7 illustrates an utilizing a third-party operation and utilizing one digital content operation sequence as part of another digital content operation sequence in accordance with one or more embodiments.

As mentioned above, in certain described embodiments, the operation compatibility system 102 merges multiple pipelines or digital content operation sequences. In particular, the operation compatibility system 102 incorporates the output of an operation from one sequence into an operation of another sequence. As also mentioned, the operation compatibility system 102 incorporates digital content editing operations associated with third-party systems. FIG. 7 illustrates merging multiple digital content operation sequences and incorporating a digital content editing operation from a third-party system in accordance with one or more embodiments.

As illustrated in FIG. 7, the operation compatibility system 102 performs or executes a first digital content operation sequence 702 (e.g., a digital image operation sequence) and a second digital content operation sequence 704 (e.g., another digital image operation sequence). As shown, the first digital content operation sequence 702 includes three digital content editing operations 706-710. Specifically, the first digital content operation sequence 702 includes a resize operation 706, a generate template operation 708, and a change color operation 710. In addition, the second digital content operation sequence 704 includes four digital content editing operations 712-718. Specifically, the second digital content operation sequence 704 includes an auto straighten operation 712, an apply preset operation 714, a replace smart object operation 716, and an automated translation operation 718 (which outputs the final generated output document 720).

As described above, the operation compatibility system 102 establishes compatibility between successive operations in each sequence to select digital content operation features for performing the various operations. In some cases, the operation compatibility system 102 also establishes compatibility across sequences. For example, the operation compatibility system 102 compares supported digital content operation features for an operation from the first digital content operation sequence 702 with supported digital content operation features for an operation from the second digital content operation sequence 704. Thus, the operation compatibility system 102 extends the first digital content operation sequence 702 to the second digital content operation sequence 704.

Specifically, as illustrated in FIG. 7, the operation compatibility system 102 establishes compatibility between the generate template operation 708 of the first digital content operation sequence 702 and the replace smart object operation 716 of the second digital content operation sequence 704. In particular, the operation compatibility system 102 compares supported digital content operation features of the generate template operation 708 with supported digital content operation features of the replace smart object operation 716. Because the replace smart object operation 716 occurs after the generate template operation 708 (e.g., by receiving an output generated by the generate template operation 708 as an input), the operation compatibility system 102 selects a (highest ranked and/or most information rich) supported feature from the listing of supported features of the replace smart object operation 716 (and that is also supported by the generate template operation 708).

In addition to the generate template operation 708, the operation compatibility system 102 also looks to the apply preset operation 714 for the replace smart object operation 716. More specifically, the operation compatibility system 102 compares supported (output) digital content operation features of the apply present operation 714 with supported (input) digital content operation features of the replace smart object operation 716. Thus, in addition to doing so for the generate template operation 708, the operation compatibility system 102 also selects a feature for the apply preset operation 714 for generating an output that is compatible with the replace smart object operation 716.

Upon establishing compatibility between the generate template operation 708 and the replace smart object operation 716, the operation compatibility system 102 executes the replace smart object operation 716. Particularly, the operation compatibility system 102 executes the replace smart object operation 716 utilizing the digital content item generated by the apply preset operation 714 and the digital content item generated by the generate template operation 708. Indeed, the operation compatibility system 102 utilizes the template generated by the generate template operation 708 to apply the template to the digital image output by the apply preset operation 714. In this way, the operation compatibility system 102 utilizes an output from one sequence as an input (e.g., for a slot of an operation) of another sequence. While the operation compatibility system 102 can only execute the replace smart object operation 716 after the generate template operation 708 and the apply preset operation 714, the operation compatibility system 102 can nevertheless execute the resize operation 706 and the generate template operation 708 in parallel (and/or the auto straighten operation 712 and the apply preset operation 714 in parallel) for efficient pipeline performance.

As further illustrated in FIG. 7, the operation compatibility system 102 incorporates a digital content editing operation associated with a third-party system 722. In particular, the operation compatibility system 102 communicates with the third-party system 722 to access and incorporate the automated translation operation 718. For example, in some cases, the automated translation operation 718 is associated with the third-party system 722. Thus, the operation compatibility system 102 communicates with the third-party system 722 to access a (hierarchical) listing of supported digital content operation features for the automated translation operation 718.

As described above, the operation compatibility system 102 further compares the supported digital content operation features of the automated translation operation 718 with those of the replace smart object operation 716. Based on the comparison, the operation compatibility system 102 selects a supported digital content operation feature to utilize in performing the replace smart object operation 716. Thus, the operation compatibility system 102 utilizes the replace smart object operation 716 to generate an output digital content item compatible with the automated translation operation 718 (and as information rich as possible). For example, in some embodiments the automated translation operation 718 utilizes ADOBE FIREFLY software to integrate third party applications into one or more pipelines.

In some cases, the operation compatibility system 102 further communicates with the third-party system 722 to cause the third-party system 722 to execute or perform the automated translation operation 718. For example, the operation compatibility system 102 provides, to the third-party system 722, the digital content item generated by the replace smart object operation 716 along with an indication to utilize the selected supported digital content operation feature. In other cases, the operation compatibility system 102 incorporates the functionality directly into the second digital content operation sequence 704 to perform the automated translation operation 718. In any case, the operation compatibility system 102 receives the output document 720 generated by the automated translation operation 718 and provides the output document 720 for display on the client device 108. While FIG. 7 illustrates a single third-party system (e.g., the third-party system 722), the operation compatibility system 102 can incorporate operations from multiple third-party systems in a single sequence and can cause the third-party systems to perform multiple operations as well.

Although FIG. 7 illustrates a particular combination of two sequences, additional combinations are possible. For example, in some embodiments, the operation compatibility system 102 feeds outputs of operations from multiple other sequences into the second digital content operation sequence 704 and/or the first digital content operation sequence 702. Thus, the operation compatibility system 102 extends one sequence to another by utilizing outputs from one operation as an input for another operation.

Additionally, in certain cases, the operation compatibility system 102 combines a digital content operation sequence for modifying a first type of digital content with a digital content operation sequence for modifying a second type of digital content. For instance, the operation compatibility system 102 utilizes a digital audio editing sequence to generate a digital audio file to incorporate into an operation of a digital video editing sequence. As another example, the operation compatibility system 102 feeds a modified digital image from a digital image editing sequence into an operation of a digital video editing sequence.

Figure 8:
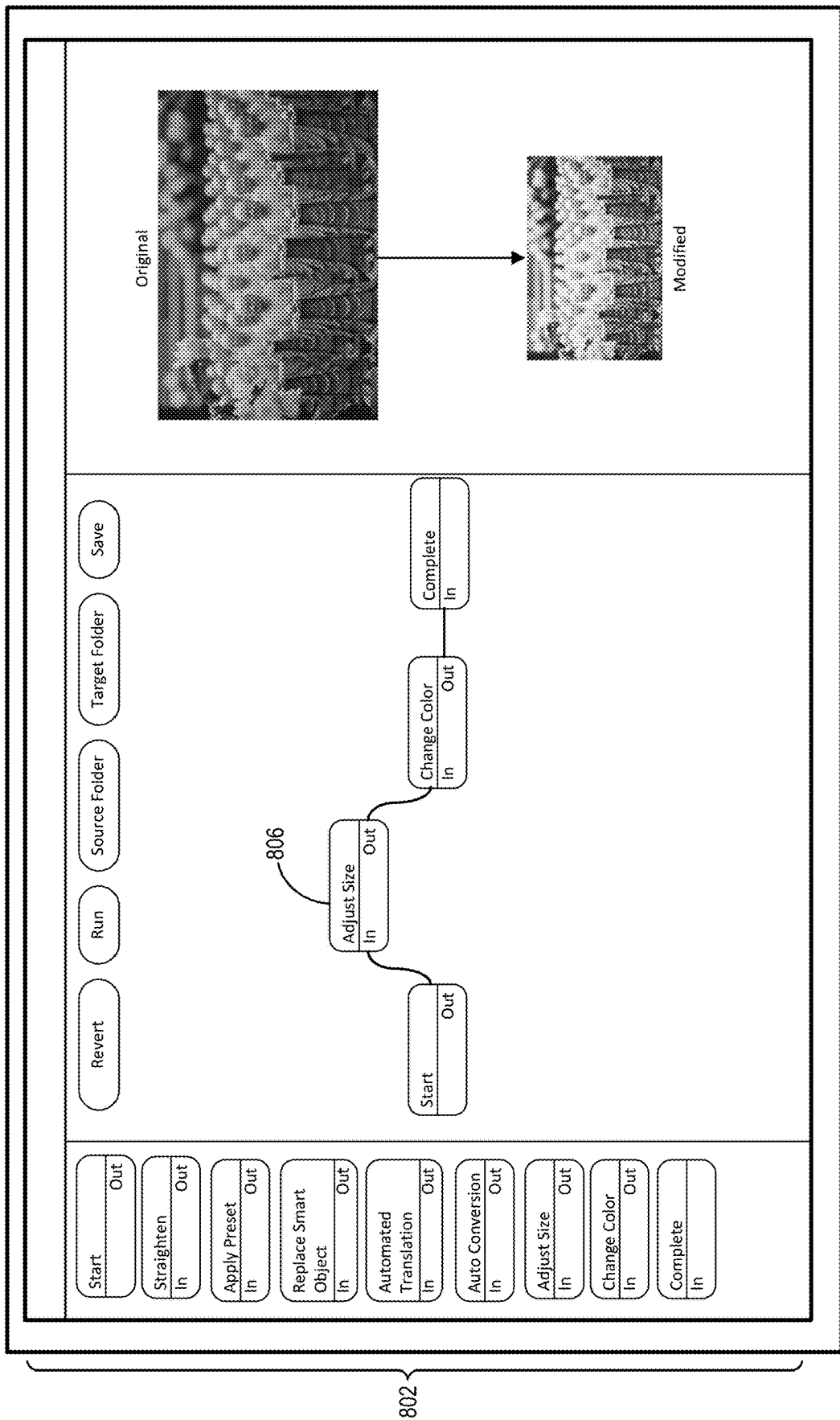
FIG. 8 illustrates an example digital content operation sequence generation interface in accordance with one or more embodiments.

As mentioned, in some embodiments, the operation compatibility system 102 generates and provides a digital content operation sequence generation interface for display on the client device 108. In particular, the operation compatibility system 102 provides a digital content operation sequence generation interface whereby a user (e.g., an administrator) can provide input to generate a digital content operation sequence including one or more digital content editing operations. FIG. 8 illustrates a digital content operation sequence generation interface 802 in accordance with one or more embodiments.

In some implementations, the operation compatibility system 102 operates with regard to multiple devices/personas. For example, in some embodiments, the operation compatibility system 102 utilizes an administrator device/persona to define the sequence of operations (which is then stored for later retrieval). Moreover, the operation compatibility system 102 utilizes a user device/persona to upload and arrange digital content. Accordingly, the user device need not interact directly with the pipeline. Rather, the operation compatibility system can automatically execute pipeline operations behind the scenes when a digital asset is stored in a folder (or explicitly when it is referenced in an upload). Accordingly, the operation compatibility system 102 can operate with administrator devices and/or user devices (as partners or individually).

As illustrated in FIG. 8, the client device 108 (e.g., associated with an administrator) displays the digital content operation sequence generation interface 802 including a listing of digital content editing operation elements 804. The digital content editing operation elements 804 are selectable to add or insert corresponding operations within a digital content operation sequence. Indeed, the operation compatibility system 102 receives, via the digital content operation sequence generation interface 802, a selection of one or more operation elements to include within a sequence (e.g., a select, drag, and drop user interaction). Based on the user interaction, the operation compatibility system 102 adds or incorporates digital content editing operations within a sequence. In addition, the operation compatibility system 102 provides a visual sequence representation including operation elements and links connecting the operation elements within the digital content operation sequence generation interface 802.

As shown, the operation compatibility system 102 sequence includes two operations, including the adjust size operation 806 and the change color operation connected after the adjust size operation 806. In addition, the digital content operation sequence generation interface 802 includes a "start" element (e.g., the leftmost element) and a "complete" element (e.g., the rightmost element). Thus, the operation compatibility system 102 provides a visual sequence representation for display. In addition, the operation compatibility system 102 provides a visual representation of executable computer code corresponding to the sequence built by the user/administrator (e.g., by clicking and dragging elements into place to link operation elements together).

Based on user interaction connecting operation elements within the digital content operation sequence generation interface 802, the operation compatibility system 102 establishes compatibility between operations corresponding to the elements. In particular, as described herein, the operation compatibility system 102 compares supported digital content operation features of the adjust size operation 806 with digital content operation features of the change color operation to select a supported feature for performing the adjust size operation 806. The operation compatibility system 102 thus selects a supported digital content operation feature to preserve information richness from the adjust size operation 806 and the change color operation.

In some cases, the operation compatibility system 102 establishes compatibility between operations corresponding to linked elements in response to receiving an indication of user interaction selecting the "Run" element from within the digital content operation sequence generation interface 802. In these or other cases, the operation compatibility system 102 receives a digital content item to modify via a digital content operation sequence. For example, the operation compatibility system 102 receives an uploaded digital image (e.g., from the client device 108 or a different client device) to modify by applying the adjust size operation 806 and the change color operation.

Further, the operation compatibility system 102 receives user interaction selecting a source and a destination of digital content items. Specifically, the operation compatibility system 102 receives an indication of a source folder (e.g., via the "Source Folder" element) and a target folder (e.g., via the "Target Folder" element). The operation compatibility system 102 identifies digital content items within an import folder to modify via the operation sequence, and the operation compatibility system 102 exports the modified digital content items to the indicated export folder. In some cases, the operation compatibility system 102 receives an indication of user interaction with a "Revert" option to revert or return to a previous state of an existing pipeline that was opened to be edited (or a new pipeline).

Figure 9:
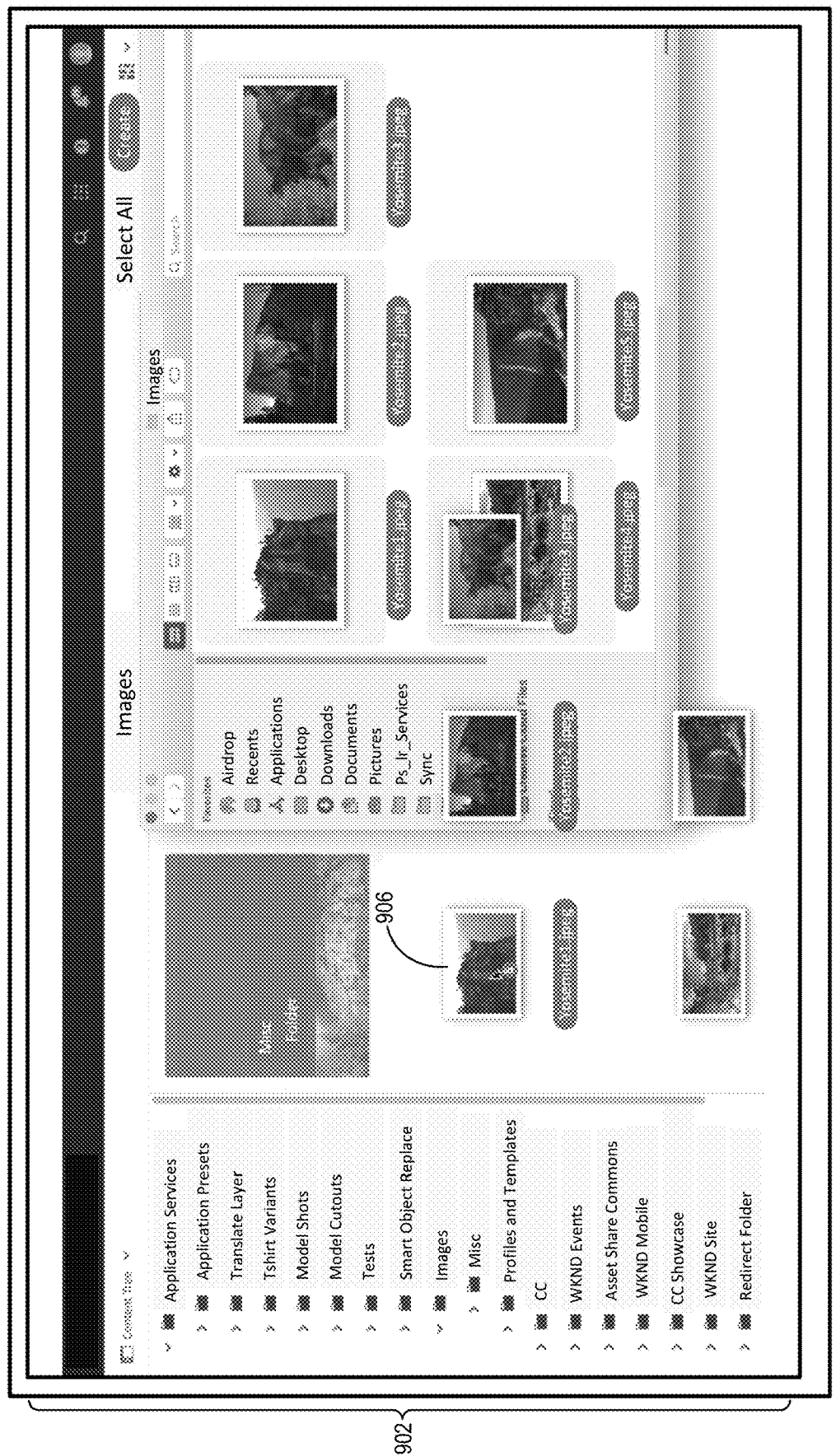
FIG. 9 illustrates an example digital content operation sequence implementation interface in accordance with one or more embodiments.

As mentioned above, in one or more embodiments, the operation compatibility system 102 generates and provides a digital content operation sequence implementation interface for display on a client device (e.g., the client device 108 or another client device different from client device 108). In particular, the operation compatibility system 102 provides a digital content operation sequence implementation interface for receiving user input to execute, perform, or implement one or more digital content operation sequences. FIG. 9 illustrates the client device 108 displaying a digital content operation sequence implementation interface 902 in accordance with one or more embodiments.

As illustrated in FIG. 9, the digital content operation sequence implementation interface 902 includes a listing of folders 904. In particular, one or more of the folders within the listing of folders 904 is associated with a respective digital content operation sequence. To elaborate, the operation compatibility system 102 utilizes a digital content operation sequence to associate or define actions to be performed to digital content items dropped or otherwise moved into a particular folder. For example, the operation compatibility system 102 receives user interaction via the digital content operation sequence generation interface 802 of FIG. 8 to generate a particular digital content operation sequence and to further affiliate, tie, or associate the digital content operation sequence with a particular folder.

Thus, upon receiving user interaction to move one or more digital content items (e.g., digital images) into the folder, the operation compatibility system 102 automatically (e.g., without additional user input) performs or executes the digital content operation sequence associated with the folder. As illustrated in FIG. 9, for example, the operation compatibility system 102 receives user interaction to move five digital images, including the digital image 906, into the "Images" folder from the listing of folders 904. Based on the user interaction to place the digital images into the "Images" folder, the operation compatibility system 102 executes a digital content operation sequence corresponding to the "Images" folder. For example, the operation compatibility system 102 performs a number of digital content editing operations, as described herein, to generate modified digital images from the digital images moved into the "Images" folder.

In some cases, the digital content operation sequence that the operation compatibility system 102 performs in response to detecting addition of digital content items to a folder indicates a particular destination folder. For instance, the sequence indicates the "Images" folder indicates another folder (e.g., within the listing of folders 904) to store modified digital content items generated as a result of performing the sequence for the "Images" folder (e.g., the folder where the digital content items are placed). Indeed, upon user interaction placing the digital image 906 into the "Images" folder, the operation compatibility system 102 executes a corresponding sequence to generate a modified digital image (from the digital image 906) and stores the modified digital image within a particular folder (e.g., the same "Images" folder or another folder).

For example, as described above, the operation compatibility system 102 sets an import and an export folder for a given operation sequence. Indeed, the operation compatibility system 102 receives user interaction via an administrator device (e.g., the client device 108) to set an import folder and export folder. As an example, the operation compatibility system 102 receives an indication to designate the "Images" folder as an import folder for a particular digital image editing sequence. Upon modifying the digital images using the sequence, the operation compatibility system 102 further exports the modified digital images to a designated export folder (e.g., "Tests" or "CC" or some other designated folder).

In one or more embodiments, the operation compatibility system 102 utilizes an exported digital content item in one folder in an operation associated with a different folder. Indeed, as described above, the operation compatibility system 102 merges multiple pipelines or sequences together by utilizing a modified digital content item output by an operation of one sequence as an input for an operation of another sequence. Thus, the operation compatibility system 102 utilizes a modified digital content item (e.g., a digital image) generated and exported into a particular folder illustrated in FIG. 9 as an input for an operation of a sequence associated with another folder.

For instance, the operation compatibility system 102 indicates (e.g., via user interaction) a particular folder and/or a particular digital content item within a folder to incorporate within an operation of the operation sequence associated with the "Images" folder. As a result, the operation compatibility system 102 modifies the digital image 906 (and the other digital images dropped into the "Images" folder) utilizing the corresponding sequence of the "Images" folder, which incorporates a modified digital image from another folder (e.g., by inserting a smart object stored in the "Smart Object Replace" folder). In a similar sense, in certain embodiments, the operation compatibility system 102 utilizes the modified version of the digital image 906 generated via the operation sequence as an input into another operation sequence associated with a different folder.

Although FIG. 9 illustrates the digital content operation sequence implementation interface 902 displayed on the client device 108, in one or more embodiments, a different client device displays the digital content operation sequence implementation interface 902. For example, the operation compatibility system 102 provides the digital content operation sequence implementation interface 902 to a client device that implements a digital content operation sequence to generate modified digital content. By contrast, the operation compatibility system 102 provides the digital content operation sequence generation interface 802 of FIG. 8 to an administrator device to generate sequences for performing from the digital content operation sequence implementation interface 902. Indeed, in some cases, the operation compatibility system 102 distributes the generated sequences to multiple client devices within respective digital content operation sequence implementation interfaces for implementing sequences generated via the digital content operation sequence generation interface of an administrator device.

Figure 10:
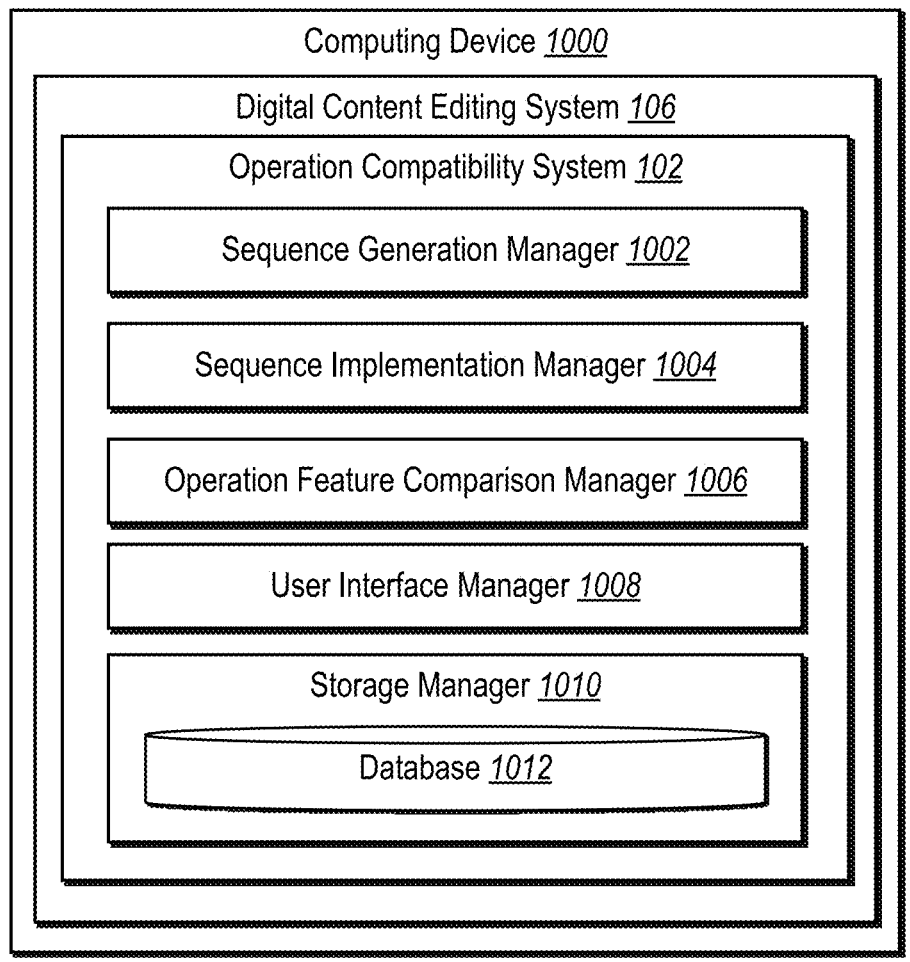
FIG. 10 illustrates a schematic diagram of an operation compatibility system in accordance with one or more embodiments.

Looking now to FIG. 10, additional detail will be provided regarding components and capabilities of the operation compatibility system 102. Specifically, FIG. 10 illustrates an example schematic diagram of the operation compatibility system 102 on an example computing device 1000 (e.g., one or more of the client device 108 and/or the server(s) 104). As shown in FIG. 10, the operation compatibility system 102 includes a sequence generation manager 1002, a sequence implementation manager 1004, an operation feature comparison manager 1006, a user interface manager 1008, and a storage manager 1010.

As just mentioned, the operation compatibility system 102 includes a sequence generation manager 1002. In particular, the sequence generation manager 1002 manages, maintains, generates, provides, arranges, assembles, or otherwise identifies a digital content operation sequence. For example, the sequence generation manager 1002 receives indications of user interaction to add and/or remove digital content editing operations to (or from) a digital content operation sequence. In some cases, the sequence generation manager 1002 communicates with the user interface manager 1008 to provide a digital content operation sequence generation interface for generating or assembling a digital content operation sequence.

In addition, the operation compatibility system 102 includes a sequence implementation manager 1004. In particular, the sequence implementation manager 1004 implements, performs, executes, or otherwise applies a digital content operation sequence. For example, the sequence implementation manager 1004 performs a sequence to modify one or more digital content items utilizing one or more digital content editing operations within the digital content operation sequence. In some cases, the sequence implementation manager 1004 communicates with the user interface manager 1008 to receive indications of user interaction with a digital content operation sequence implementation interface to implement or apply a sequence to one or more digital content items (e.g., digital images dropped into a particular folder).

As illustrated in FIG. 10, the operation compatibility system 102 also includes an operation feature comparison manager 1006. In particular, the operation feature comparison manager 1006 manages, maintains, compares, accesses, determines, detects, analyzes, generates, selects, or otherwise identifies digital content operation features for individual digital content editing operations. For example, the operation feature comparison manager 1006 determines digital content operation features of a first operation and a second operation to compare for selecting a digital content operation feature supported by both the first operation and the second operation. Indeed, the operation feature comparison manager 1006 establishes compatibility between successive operations of a digital content operation sequence, while also maintaining digital content quality and information richness.

As further shown in FIG. 10, the operation compatibility system 102 includes a user interface manager 1008. In particular, the user interface manager 1008 manages, maintains, provides, displays, presents, or distributes one or more user interfaces. For example, the user interface manager 1008 provides a digital content operation sequence generation interface to an administrator device (e.g., the client device 108) to generate a digital content operation sequence. In addition, the user interface manager 1008 provides a digital content operation sequence implementation interface to a client device (e.g., the client device 108 or a different client device than the one by which the sequence is generated) for implementing or applying a digital content operation sequence to modify one or more digital content items. Indeed, the user interface manager 1008 receives user interactions, or indications of user interactions, to generate and/or implement digital content operation sequences.

The operation compatibility system 102 further includes a storage manager 1010. The storage manager 1010 operates in conjunction with or include one or more memory devices such as the database 1012 (e.g., the database 112) that store various data such as a repository of digital content items and digital content editing operations. The storage manager 1010 (e.g., via a non-transitory computer memory/one or more memory devices) stores and maintains data associated with establishing compatibility between digital content editing operations, executing digital content operation sequences, and providing various user interfaces (e.g., within the database 1012). In some cases, the database 1012 stores a plurality of digital image editing operations including a first digital image editing operation and a second digital image operation. In other cases, the operation compatibility system 102 accesses operations from an external storage manager (e.g., using ADOBE FIREFLY). In addition, the database 1012 stores sets of supported digital image file types including a first set of supported image digital file types corresponding to the first digital image editing operation and a second set of supported digital image file types corresponding to the second digital image editing operation. Further, the database 1012 stores a digital image file type hierarchy (e.g., associated with a particular operation or associated with the operation compatibility system 102 as a master list).

In one or more embodiments, each of the components of the operation compatibility system 102 are in communication with one another using any suitable communication technologies. Additionally, the components of the operation compatibility system 102 is in communication with one or more other devices including one or more client devices described above. It will be recognized that although the components of the operation compatibility system 102 are shown to be separate in FIG. 10, any of the subcomponents may be combined into fewer components, such as into a single component, or divided into more components as may serve a particular implementation. Furthermore, although the components of FIG. 10 are described in connection with the operation compatibility system 102, at least some of the components for performing operations in conjunction with the operation compatibility system 102 described herein may be implemented on other devices within the environment.

The components of the operation compatibility system 102 can include software, hardware, or both. For example, the components of the operation compatibility system 102 can include one or more instructions stored on a computer-readable storage medium and executable by processors of one or more computing devices (e.g., the computing device 1000). When executed by the one or more processors, the computer-executable instructions of the operation compatibility system 102 can cause the computing device 1000 to perform the methods described herein. Alternatively, the components of the operation compatibility system 102 can comprise hardware, such as a special purpose processing device to perform a certain function or group of functions. Additionally, or alternatively, the components of the operation compatibility system 102 can include a combination of computer-executable instructions and hardware.

Furthermore, the components of the operation compatibility system 102 performing the functions described herein may, for example, be implemented as part of a stand-alone application, as a module of an application, as a plug-in for applications including content management applications, as a library function or functions that may be called by other applications, and/or as a cloud-computing model. Thus, the components of the operation compatibility system 102 may be implemented as part of a stand-alone application on a personal computing device or a mobile device. Alternatively, or additionally, the components of the operation compatibility system 102 may be implemented in any application that allows creation and delivery of marketing content to users, including, but not limited to, applications in ADOBE® EXPERIENCE MANAGER and CREATIVE CLOUD®, such as ADOBE® STOCK, PHOTO SHOP®, ILLUSTRATOR®, and INDESIGN®. "ADOBE," "ADOBE EXPERIENCE MANAGER," "CREATIVE CLOUD," "ADOBE STOCK," "PHOTOSHOP," "ILLUSTRATOR," and "INDESIGN" are either registered trademarks or trademarks of Adobe Inc. in the United States and/or other countries.

FIGS. 1-10 the corresponding text, and the examples provide a number of different systems, methods, and non-transitory computer readable media for establishing compatibility connections between successive digital content editing operations in digital content operation sequences. In addition to the foregoing, embodiments can also be described in terms of flowcharts comprising acts for accomplishing a particular result. For example, FIG. 11 illustrates a flowchart of example sequences or series of acts in accordance with one or more embodiments.

Figure 11:
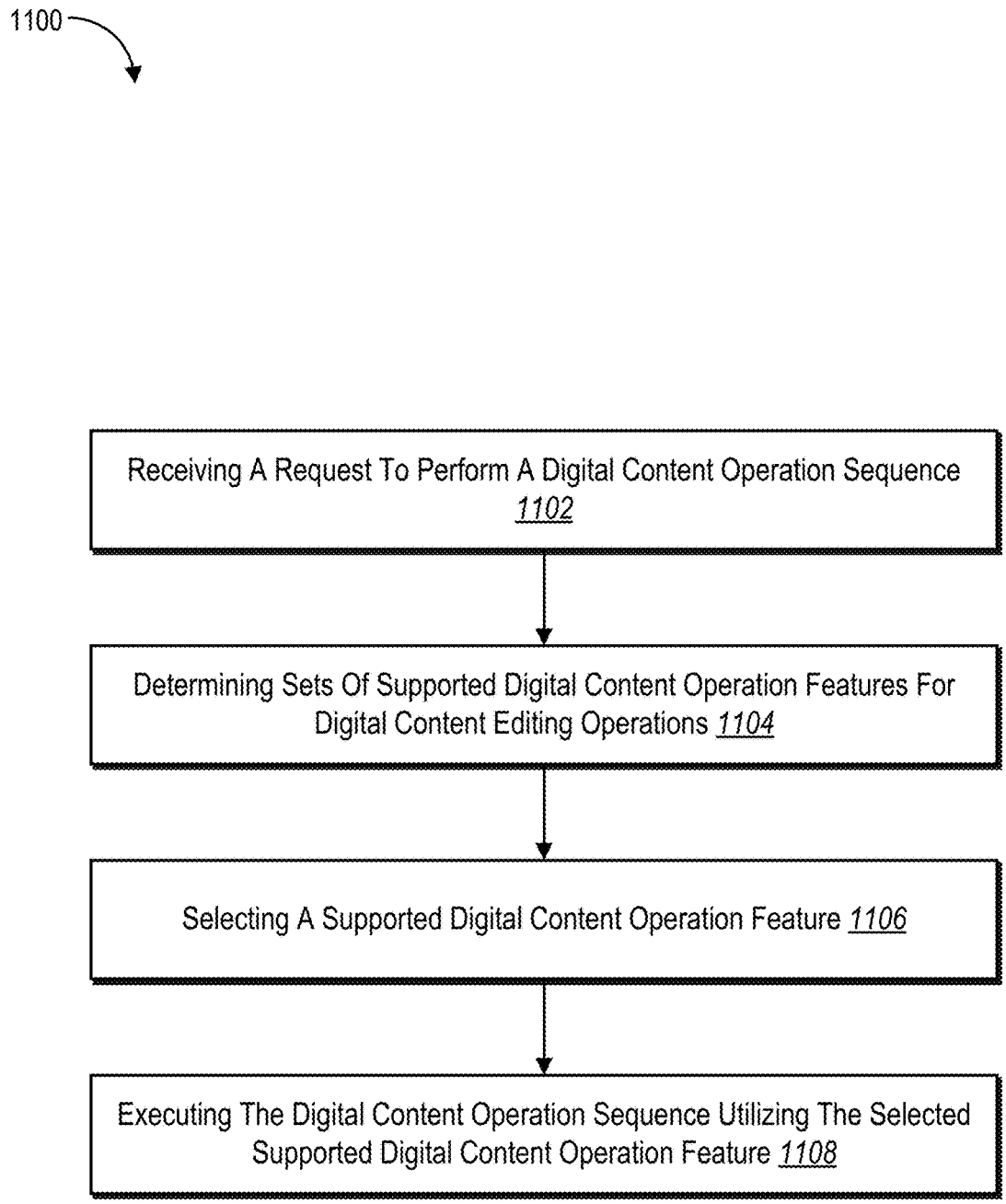
FIG. 11 illustrates a flowchart of a series of acts for establishing compatibility between operations of, and executing, a digital content operation sequence in accordance with one or more embodiments.

While FIG. 11 illustrates acts according to one embodiment, alternative embodiments may omit, add to, reorder, and/or modify any of the acts shown in FIG. 11. The acts of FIG. 11 can be performed as part of a method. Alternatively, a non-transitory computer readable medium can comprise instructions, that when executed by one or more processors, cause a computing device to perform the acts of FIG. 11. In still further embodiments, a system can perform the acts of FIG. 11. Additionally, the acts described herein may be repeated or performed in parallel with one another or in parallel with different instances of the same or other similar acts.

FIG. 11 illustrates an example series of acts 1100 of establishing compatibility connections between, and executing, successive digital content editing operations in digital content operation sequences. In particular, the series of acts 1100 includes an act 1102 of receiving a request to perform a digital content operation sequence. For example, the act 1102 involves receiving a request via a client device to perform a digital content operation sequence for editing a digital content item, the digital content operation sequence comprising a first digital content editing operation and a second digital content editing operation. In some cases, the series of acts 1100 includes an act of receiving a digital image and a digital image operation sequence including a first digital image editing operation and a second digital image editing operation. In certain embodiments, receiving the request to perform the digital content operation sequence involves receiving a first user interaction selecting the first digital content editing operation and a second user interaction selecting the second digital content editing operation.

As shown, the series of acts 1100 also includes an act 1104 of determining sets of supported digital content operation features digital content operations. In particular, the act 1104 involves determining a first set of supported digital content operation features for the first digital content editing operation and a second set of supported digital content operation features for the second digital content editing operation. For example, the act 1104 involves determining the first set of supported digital content operation features for the first digital content editing operation by determining supported digital image file types for a digital image editing operation. In some embodiments, the second set of supported digital content operation features includes a hierarchical arrangement of supported digital content operation features. Indeed, the act 1104 involves identifying a ranked list of digital content operation features associated with the first digital content editing operation. In some cases, the series of acts 1100 includes an act of determining a digital image file type hierarchy by accessing a second set of supported digital image file types (associated with a second digital image editing operation) including a list of supported digital image file types arranged according to information richness.

Additionally, the series of acts 1100 includes an act 1106 of selecting a supported digital content operation feature. In particular, the act 1106 involves selecting a supported digital content operation feature from the first set of supported digital content operation features by comparing the first set of supported digital content operation features and the second set of supported digital content operation features. For example, the act 1106 involves selecting, from the first set of supported digital content operation features, a supported digital content operation feature that has a lowest information loss in relation to a limiting digital content operation feature from among the second set of supported digital content operation features. In some cases, the act 1106 involves comparing the first set of supported digital content operation features against the hierarchical arrangement of supported digital content operation features.

In one or more embodiments, the act 1106 involves determining that the supported digital content operation feature is ranked higher in the hierarchy of digital content operation features (of the second digital content editing operation) than one or more other supported digital content operation features. In the same or other embodiments, the act 1106 involves selecting a digital image file type from a listing of digital image file types arranged according to information richness. In some cases, the act 1106 involves selecting a digital image file type from a first set of supported digital image file types by comparing the first set of supported digital image file types and a second set of supported digital image file types utilizing a digital image file type hierarchy. For example, the act 1106 involves selecting, from a first set of supported digital image file types, a supported digital image file type ranked highest in the digital image file type hierarchy.

Further, the series of acts 1100 includes an act 1108 of executing the digital content operation sequence utilizing the selected supported digital content operation feature. In particular, the act 1108 involves executing the digital content operation sequence by performing the first digital content editing operation utilizing the selected supported digital content operation feature and by performing the second digital content operation. In some cases, the act 1108 involves executing the digital image operation sequence to generate a modified digital image from the digital image by performing the first digital image editing operation utilizing the selected digital image file type. For example, the act 1108 involves executing a plurality of digital image editing operations by further performing a second digital image editing operation to generate the modified digital image from a selected digital image file type.

In some embodiments, the series of acts 1100 includes acts of determining a third set of supported digital content operation features for a third digital content editing operation included within the digital content operation sequence, selecting a second supported digital content operation feature from the second set of supported digital content operation features, and executing the digital content operation sequence by performing the second selected digital content editing operation utilizing the second supported digital content operation. In some cases, selecting the second supported digital content operation feature includes comparing the second set of digital content operation features and the third set of digital content operation features. In certain embodiments, the series of acts 1100 includes an act of selecting a third supported digital content operation feature from the third set of supported digital content operation features by receiving, via the client device, user interaction selecting the third supported digital content operation feature.

In one or more embodiments, the series of acts 1100 includes an act of receiving, via a client device, user interaction indicating a third-party digital image editing operation from a third-party system to include within the digital image operation sequence. In addition, the series of acts 1100 includes acts of determining a third set of supported digital image file types associated with the third-party digital image editing operation and selecting a second digital image file type from the second set of supported digital image file types by comparing the second set of supported digital image file types with the third set of supported digital image file types. In some embodiments, the series of acts 1100 includes an act of executing the digital image operation sequence to generate the modified digital image from the digital image by further causing the third-party system to perform the third-party digital image editing operation utilizing the second selected digital image file type.

In certain embodiments, the series of acts 1100 includes an act of receiving a third digital image editing operation to include within the digital image operation sequence after the second digital image editing operation. Additionally, the series of acts 1100 includes acts of determining that supported digital image file types from the second set of supported digital image file types are incompatible with supported digital image file types from a third set of digital image file types associated with the third digital image editing operation, selecting a fourth digital image editing operation associated with a fourth set of supported digital image file types compatible with both the second set of supported digital image file types and the third set of digital image file types, and incorporating the fourth digital image editing operation within the digital image operation sequence after the second digital image editing operation and before the third digital image editing operation.

In some embodiments, the series of acts 1100 includes an act of receiving an indication to perform a second digital content operation sequence including additional digital content editing operations. In addition, the series of acts 1100 includes an act of extending the digital content operation sequence to the second digital content operation sequence by executing the second digital content operation sequence utilizing the modified digital content item.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory, etc.), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed at a processor, cause a general-purpose computer, special purpose computer, or special purpose processing device to perform a certain function or group of functions. In some embodiments, computer-executable instructions are executed on a general-purpose computer to turn the general-purpose computer into a special purpose computer implementing elements of the disclosure. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. In this description, "cloud computing" is defined as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In this description and in the claims, a "cloud-computing environment" is an environment in which cloud computing is employed.

Figure 12:
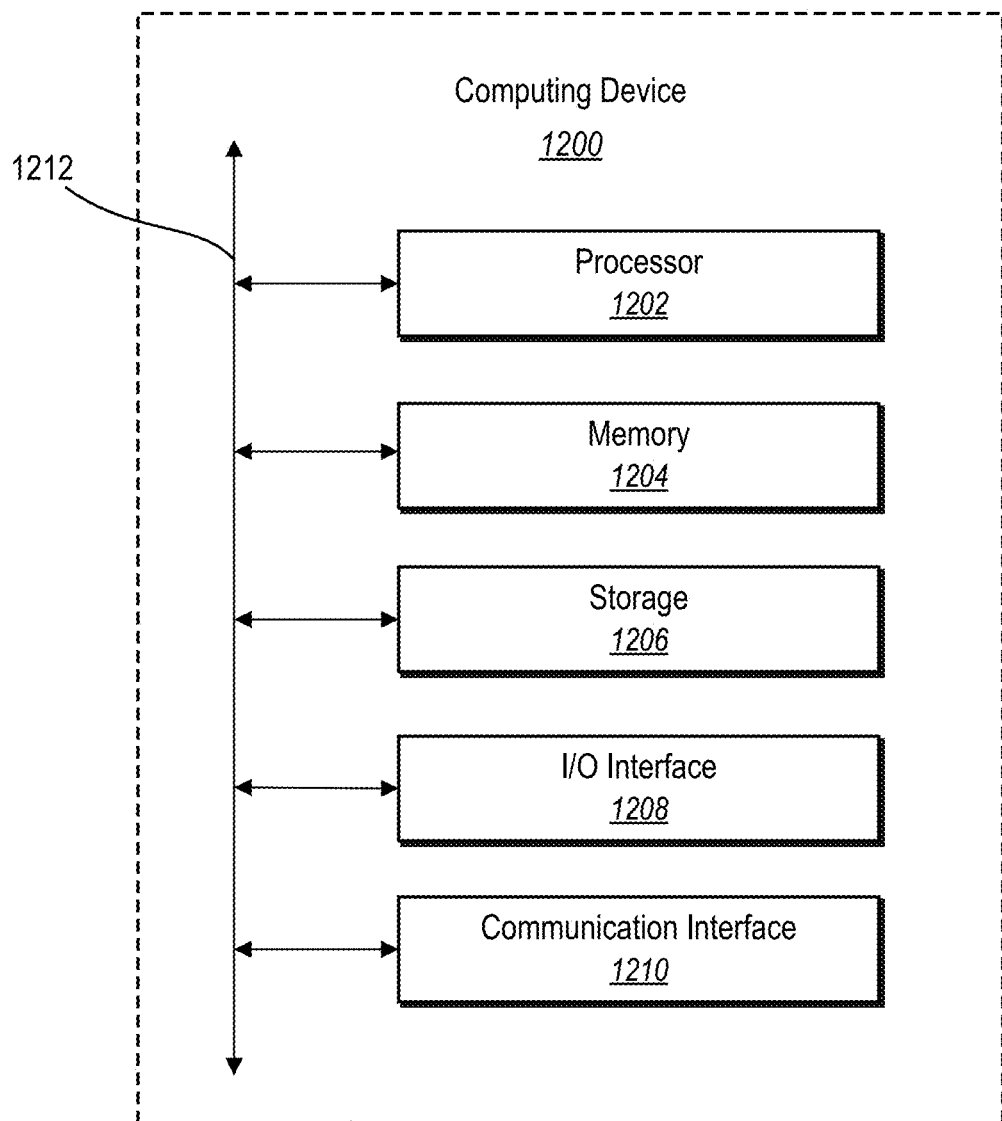
FIG. 12 illustrates a block diagram of an example computing device in accordance with one or more embodiments.

FIG. 12 illustrates, in block diagram form, an example computing device 1200 (e.g., the computing device 1000, the client device 108, and/or the server(s) 104) that may be configured to perform one or more of the processes described above. One will appreciate that the operation compatibility system 102 can comprise implementations of the computing device 1200. As shown by FIG. 12, the computing device can comprise a processor 1202, memory 1204, a storage device 1206, an I/O interface 1208, and a communication interface 1210. Furthermore, the computing device 1200 can include an input device such as a touchscreen, mouse, keyboard, etc. In certain embodiments, the computing device 1200 can include fewer or more components than those shown in FIG. 12. Components of computing device 1200 shown in FIG. 12 will now be described in additional detail.

In particular embodiments, processor(s) 1202 includes hardware for executing instructions, such as those making up a computer program. As an example, and not by way of limitation, to execute instructions, processor(s) 1202 may retrieve (or fetch) the instructions from an internal register, an internal cache, memory 1204, or a storage device 1206 and decode and execute them.

The computing device 1200 includes memory 1204, which is coupled to the processor(s) 1202. The memory 1204 may be used for storing data, metadata, and programs for execution by the processor(s). The memory 1204 may include one or more of volatile and non-volatile memories, such as Random-Access Memory ("RAM"), Read Only Memory ("ROM"), a solid-state disk ("SSD"), Flash, Phase Change Memory ("PCM"), or other types of data storage. The memory 1204 may be internal or distributed memory.

The computing device 1200 includes a storage device 1206 includes storage for storing data or instructions. As an example, and not by way of limitation, storage device 1206 can comprise a non-transitory storage medium described above. The storage device 1206 may include a hard disk drive (HDD), flash memory, a Universal Serial Bus (USB) drive or a combination of these or other storage devices.

The computing device 1200 also includes one or more input or output ("I/O") devices/interfaces 1208, which are provided to allow a user to provide input to (such as user strokes), receive output from, and otherwise transfer data to and from the computing device 1200. These I/O devices/interfaces 1208 may include a mouse, keypad or a keyboard, a touch screen, camera, optical scanner, network interface, modem, other known I/O devices or a combination of such I/O devices/interfaces 1208. The touch screen may be activated with a writing device or a finger.

The I/O devices/interfaces 1208 may include one or more devices for presenting output to a user, including, but not limited to, a graphics engine, a display (e.g., a display screen), one or more output drivers (e.g., display drivers), one or more audio speakers, and one or more audio drivers. In certain embodiments, devices/interfaces 1208 is configured to provide graphical data to a display for presentation to a user. The graphical data may be representative of one or more graphical user interfaces and/or any other graphical content as may serve a particular implementation.

The computing device 1200 can further include a communication interface 1210. The communication interface 1210 can include hardware, software, or both. The communication interface 1210 can provide one or more interfaces for communication (such as, for example, packet-based communication) between the computing device and one or more other computing devices 1200 or one or more networks. As an example, and not by way of limitation, communication interface 1210 may include a network interface controller (NIC) or network adapter for communicating with an Ethernet or other wire-based network or a wireless NIC (WNIC) or wireless adapter for communicating with a wireless network, such as a WI-FI. The computing device 1200 can further include a bus 1212. The bus 1212 can comprise hardware, software, or both that couples components of computing device 1200 to each other.

In the foregoing specification, the invention has been described with reference to specific example embodiments thereof. Various embodiments and aspects of the invention(s) are described with reference to details discussed herein, and the accompanying drawings illustrate the various embodiments. The description above and drawings are illustrative of the invention and are not to be construed as limiting the invention. Numerous specific details are described to provide a thorough understanding of various embodiments of the present invention.

The present invention may be embodied in other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel with one another or in parallel with different instances of the same or similar steps/acts. The scope of the invention is, therefore, indicated by the appended claims rather than by the foregoing description. All changes that come within the meaning and range of equivalency of the claims are to be embraced within their scope.

What is claimed is:

1. A non-transitory computer readable medium storing executable instructions that, when executed by a processing device, cause the processing device to perform operations comprising:
   receiving a request via a client device to perform a digital content operation sequence for editing a digital content item, the digital content operation sequence comprising a first digital content editing operation and a second digital content editing operation;
   determining a first set of supported digital content operation features for the first digital content editing operation and a second set of supported digital content operation features for the second digital content editing operation;
   selecting a commonly supported digital content operation feature shared by the first set of supported digital content operation features and the second set of supported digital content operation features by comparing the first set of supported digital content operation features and the second set of supported digital content operation features; and
   executing the digital content operation sequence by performing the first digital content editing operation utilizing the commonly supported digital content operation feature and by performing the second digital content editing operation.

2. The non-transitory computer readable medium of claim 1, wherein selecting the commonly supported digital content operation feature further comprises selecting, from the first set of supported digital content operation features, a supported digital content operation feature that has a lowest information loss in relation to a limiting digital content operation feature from among the second set of supported digital content operation features.

3. The non-transitory computer readable medium of claim 1, wherein the second set of supported digital content operation features comprises a hierarchical arrangement of supported digital content operation features; and
   wherein selecting the commonly supported digital content operation feature comprises comparing the first set of supported digital content operation features against the hierarchical arrangement of supported digital content operation features.

4. The non-transitory computer readable medium of claim 3, wherein selecting the commonly supported digital content operation feature further comprises determining that the commonly supported digital content operation feature is ranked higher in the hierarchical arrangement of supported digital content operation features than one or more other commonly supported digital content operation features.

5. The non-transitory computer readable medium of claim 1, wherein selecting the commonly supported digital content operation feature comprises selecting a digital image file type from a listing of digital image file types arranged according to information richness.

6. The non-transitory computer readable medium of claim 1, further storing executable instructions that, when executed by the processing device, cause the processing device to perform operations comprising:
   determining a third set of supported digital content operation features for a third digital content editing operation included within the digital content operation sequence;
   selecting a second commonly supported digital content operation feature shared by the second set of supported digital content operation features and the third set of supported digital content operation features; and
   executing the digital content operation sequence by performing the second digital content editing operation utilizing the second commonly supported digital content operation feature.

7. The non-transitory computer readable medium of claim 6, wherein selecting the second commonly supported digital content operation feature comprises comparing the second set of supported digital content operation features and the third set of supported digital content operation features.

8. The non-transitory computer readable medium of claim 6, further storing executable instructions that, when executed by the processing device, cause the processing device to perform operations comprising selecting a third commonly supported digital content operation feature from the third set of supported digital content operation features by receiving, via the client device, user interaction selecting the third commonly supported digital content operation feature.

9. A system comprising:
   one or more memory devices storing:
   a plurality of digital image editing operations comprising a first digital image editing operation and a second digital image editing operation;
   sets of supported digital image file types comprising a first set of supported digital image file types corresponding to the first digital image editing operation and a second set of supported digital image file types corresponding to the second digital image editing operation; and
   a digital image file type hierarchy;
   one or more processors configured to cause the system to perform operations comprising:
   receiving a digital image and a digital image operation sequence comprising the first digital image editing operation and the second digital image editing operation;
   selecting a commonly supported digital image file type shared by the first set of supported digital image file types and the second set of supported digital image file types by comparing the first set of supported digital image file types and the second set of supported digital image file types utilizing the digital image file type hierarchy; and
   executing the digital image operation sequence to generate a modified digital image from the digital image by performing the first digital image editing operation utilizing the commonly supported digital image file type.

10. The system of claim 9, wherein the one or more processors are further configured to cause the system to perform operations comprising determining the digital image file type hierarchy by accessing the second set of supported digital image file types comprising a list of supported digital image file types arranged according to information richness.

11. The system of claim 9, wherein selecting the commonly supported digital image file type comprises selecting, from the first set of supported digital image file types, a supported digital image file type ranked highest in the digital image file type hierarchy.

12. The system of claim 9, wherein executing the plurality of digital image editing operations further comprises performing the second digital image editing operation to generate the modified digital image from the commonly supported digital image file type.

13. The system of claim 9, wherein the one or more processors are further configured to cause the system to perform operations comprising:
   receiving, via a client device, user interaction indicating a third-party digital image editing operation from a third-party system to include within the digital image operation sequence;
   determining a third set of supported digital image file types associated with the third-party digital image editing operation; and
   selecting a second commonly supported digital image file type shared by the second set of supported digital image file types and the third set of supported digital image file types by comparing the second set of supported digital image file types with the third set of supported digital image file types.

14. The system of claim 13, wherein executing the digital image operation sequence to generate the modified digital image from the digital image further comprises causing the third-party system to perform the third-party digital image editing operation utilizing the second commonly supported digital image file type.

15. The system of claim 9, wherein the one or more processors are further configured to cause the system to perform operations comprising:
- receiving a third digital image editing operation to include within the digital image operation sequence after the second digital image editing operation;
- determining that supported digital image file types from the second set of supported digital image file types are incompatible with supported digital image file types from a third set of digital image file types associated with the third digital image editing operation;
- selecting a fourth digital image editing operation associated with a fourth set of supported digital image file types compatible with both the second set of supported digital image file types and the third set of digital image file types; and
- incorporating the fourth digital image editing operation within the digital image operation sequence after the second digital image editing operation and before the third digital image editing operation.

16. A computer-implemented method for deep image manipulation utilizing global and spatial autoencoders, the computer-implemented method comprising:
- receiving a request via a client device to perform a digital content operation sequence for editing a digital content item, the digital content operation sequence comprising a first digital content editing operation and a second digital content editing operation;
- determining a first set of supported digital content operation features for the first digital content editing operation and a second set of supported digital content operation features for the second digital content editing operation; and
- selecting a commonly supported digital content operation feature shared by the first set of supported digital content operation features and the second set of supported digital content operation features by comparing the first set of supported digital content operation features and the second set of supported digital content operation features; and
- executing the digital content operation sequence by performing the first digital content editing operation utilizing the commonly supported digital content operation feature and by performing the second digital content editing operation.

17. The computer-implemented method of claim 16, wherein receiving the request to perform the digital content operation sequence comprises receiving a first user interaction selecting the first digital content editing operation and a second user interaction selecting the second digital content editing operation.

18. The computer-implemented method of claim 16, wherein determining the first set of supported digital content operation features comprises identifying a ranked list of digital content operation features associated with the first digital content editing operation.

19. The computer-implemented method of claim 16, further comprising:
- receiving an indication to perform a second digital content operation sequence comprising additional digital content editing operations; and
- extending the digital content operation sequence to the second digital content operation sequence by executing the second digital content operation sequence utilizing a modified digital content item generated by executing the digital content operation sequence on the digital content item.

20. The computer-implemented method of claim 16, further comprising determining the first set of supported digital content operation features for the first digital content editing operation by determining supported digital image file types for a digital image editing operation.

* * * * *